(12) United States Patent
Cornthwaite

(10) Patent No.: US 12,458,921 B2
(45) Date of Patent: Nov. 4, 2025

(54) ELECTROMAGNETIC PLASMA SEPARATOR

(71) Applicant: Universal Atmosphere Processing UK LTD, Liverpool (GB)

(72) Inventor: Brendan Cornthwaite, Denver, CO (US)

(73) Assignee: Universal Atmosphere Processing UK LTD, Liverpool (GB)

( * ) Notice: Subject to any disclaimer, the term of this patent is extended or adjusted under 35 U.S.C. 154(b) by 36 days.

(21) Appl. No.: 18/625,902

(22) Filed: Apr. 3, 2024

(65) Prior Publication Data
US 2024/0359133 A1 Oct. 31, 2024

Related U.S. Application Data

(60) Provisional application No. 63/461,935, filed on Apr. 26, 2023.

(51) Int. Cl.
*B01D 53/02* (2006.01)
*B01D 53/30* (2006.01)
(Continued)

(52) U.S. Cl.
CPC .............. *B01D 53/32* (2013.01); *B01D 53/30* (2013.01); *B03C 1/023* (2013.01); *F01D 15/08* (2013.01);
(Continued)

(58) Field of Classification Search
CPC .. B01D 53/32; B01D 53/30; B01D 2257/504; B01D 2257/7025; B01D 2258/06;
(Continued)

(56) References Cited

U.S. PATENT DOCUMENTS 5,477,975 A * 12/1995 Rice ................. H01J 37/32165
438/909
2022/0219977 A1* 7/2022 Ishikawa ................. C01B 3/50
(Continued)

FOREIGN PATENT DOCUMENTS

CN 113304584 A 8/2021
KR 20040077090 A 9/2004
(Continued)

OTHER PUBLICATIONS

International Search Report and Written Opinion in corresponding PCT Application No. PCT/GB2024/051083, mailed Jan. 10, 2024, 13 pages.

*Primary Examiner* — Christopher P Jones
(74) *Attorney, Agent, or Firm* — Cozen O'Connor

(57) ABSTRACT

An approach is disclosed processing elements from input gases. The input gases are received into an electromagnetic plasma separator where the input gases are heated to at least 8000 degrees Kelvin, via a plasma combustor, to form a gas plasma element state. The gas plasma element state is sent through a series of concentrated super conducting magnets M ($M_1$, $M_2$, ..., $M_i$, ..., $M_n$), i>1, which act as targeted plasma separators. Each super conducting magnet $M_i$ in the series of concentrated super conducting magnets M ($M_1$, $M_2$, ..., $M_i$, ..., $M_n$) extracts a corresponding individual plasma state element from the gas plasma into a corresponding separated element S ($S_1$, $S_2$, .... $S_i$, ..., Sn) until a residue of oxygen, nitrogen, and other trace elements remain. The corresponding plasma state element is extracted into a separation arrangement.

19 Claims, 25 Drawing Sheets

(51) Int. Cl.
   *B01D 53/32* (2006.01)
   *B03C 1/023* (2006.01)
   *F01D 15/08* (2006.01)
   *H05H 1/00* (2006.01)

(52) U.S. Cl.
   CPC ......... *H05H 1/01* (2021.05); *B01D 2257/504* (2013.01); *B01D 2257/7025* (2013.01); *B01D 2258/06* (2013.01); *B01D 2259/818* (2013.01); *B03C 2201/16* (2013.01)

(58) Field of Classification Search
   CPC .... B01D 2259/818; H05H 1/01; B03C 1/023; B03C 2201/16; F01D 15/08
   See application file for complete search history.

(56) References Cited

U.S. PATENT DOCUMENTS

| | | | | |
|---|---|---|---|---|
| 2022/0399134 | A1* | 12/2022 | Ishikawa | G21B 3/006 |
| 2023/0285625 | A1* | 9/2023 | Kimura | B01D 53/32 |
| 2024/0200213 | A1* | 6/2024 | Mills | H02S 40/22 |

FOREIGN PATENT DOCUMENTS

| | | |
|---|---|---|
| KR | 100658374 B1 | 12/2006 |
| WO | 2004098246 A1 | 11/2004 |

\* cited by examiner

External view of EMPS 700

Internal details of EMPS 800

Top view of EMPS 900

Separated view of heat exchanger 1300
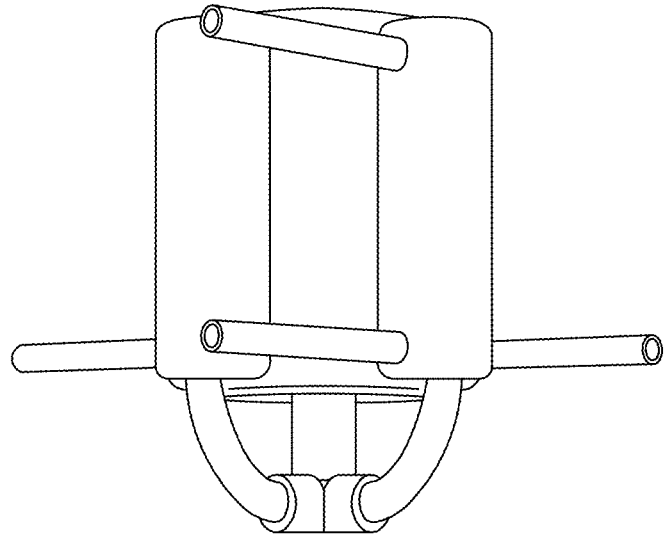
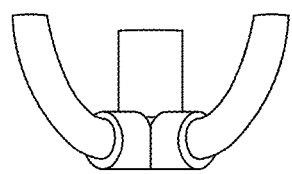
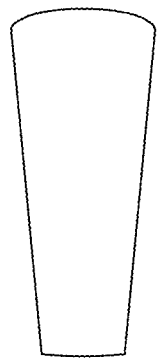
FIG. 13

Superconducting magnets with plasma pipework 1500

Input and output air elements 2400

| Element | Percentage |
|---|---|
| N2 | 78.02 |
| O2 | 20.95 |
| Ar | 0.93 |
| CO2 | 0.04 |
| Ne | 0.0018 |
| He | 0.0005 |
| CH4 | 0.0002 |
| Kr | 0.0001 |
| H2 | 0.00005 |

Input Air 2410

| Element | Percentage |
|---|---|
| N2 | 78.02 |
| O2 | 20.95 |
| Ar | 0.93 |
|  |  |
| Ne | 0.0018 |
| He | 0.0005 |
|  |  |
| Kr | 0.0001 |
| H2 | 0.00005 |

Returned to Atmosphere 2420

Nitrous Oxide (n2o)
Ozone (o3)
Sulfur Dioxide (so2)

Other elements removed 2430

FIG. 24

ELECTROMAGNETIC PLASMA SEPARATOR

If an Application Data Sheet (ADS) has been filed for this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority application(s)). In addition, the present application is related to the "Related Applications," if any, listed below.

PRIORITY APPLICATIONS

For purposes of the USPTO extra-statutory requirements, the present application constitutes a utility application related to and claims the benefit of priority from U.S. Provisional Patent Application Ser. No. 63/461,935 filed Apr. 26, 2023; the contents of which are incorporated herein by reference in their entirety.

BACKGROUND

The present invention relates to impure gas treatment processes and apparatuses, and more particularly, to an electromagnetic plasma separator for eliminating greenhouse gases and thereby facilitating a reversal of climate change.

SUMMARY

According to an embodiment of the present invention, there is a method for processing elements from input gases. The input gases are received into an electromagnetic plasma separator. The input gases are heated to at least 8000 degrees Kelvin, via a plasma combustor, to a plasma state forming a gas plasma element state. The gas plasma element state is sent through a series of concentrated super conducting magnets M ($M_1$, $M_2$, ..., $M_i$, ..., $M_n$), i>1, which act as targeted plasma separators. Each super conducting magnet $M_i$ in the series of concentrated super conducting magnets M ($M_1$, $M_2$, ..., $M_i$, ..., $M_n$) extracts a corresponding individual plasma state element from the gas plasma into a corresponding separated element S ($S_1$, $S_2$, ... $S_i$, ..., Sn) until a residue of oxygen, nitrogen, and other trace elements remain. The corresponding plasma state element is extracted into a separation arrangement.

According to one embodiment of the invention, there is provided a system for processing input gases executing the steps of the method for processing input gases.

According to one embodiment of the invention, there is provided a plasma separator apparatus for processing input gases. The plasma separator apparatus includes an initial power source, a boiler unit, a turbine having a condenser, a heat exchanger unit, a magnetic core, a series of content targeted plasma separators, and an exhaust unit. The condenser, the heat exchanger unit, the magnetic core, and the separation unit are arranged in a closed-loop system. The turbine receives power from steam generated by the heat exchanger unit. The apparatus receives input gases and heats the input gases to at least 8000 degrees Kelvin, via a plasma combustor, to a plasma state forming a gas plasma element state. The gas plasma element state is sent through a series of concentrated super conducting magnets M ($M_1$, $M_2$, ..., $M_i$, ..., $M_n$), i>1, which act as targeted plasma separators. The plasma separator is configured to extract, by the series of content targeted plasma separators, a corresponding plasma state element into a corresponding plasma separation element until a residue of oxygen, nitrogen, and other trace elements remain. The corresponding plasma state element is expelled into an exhaust arrangement.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 13 depicts a separated view of heat exchanger;

FIG. 24 depicts input and output air elements; and

DETAILED DESCRIPTION

Figure 1:
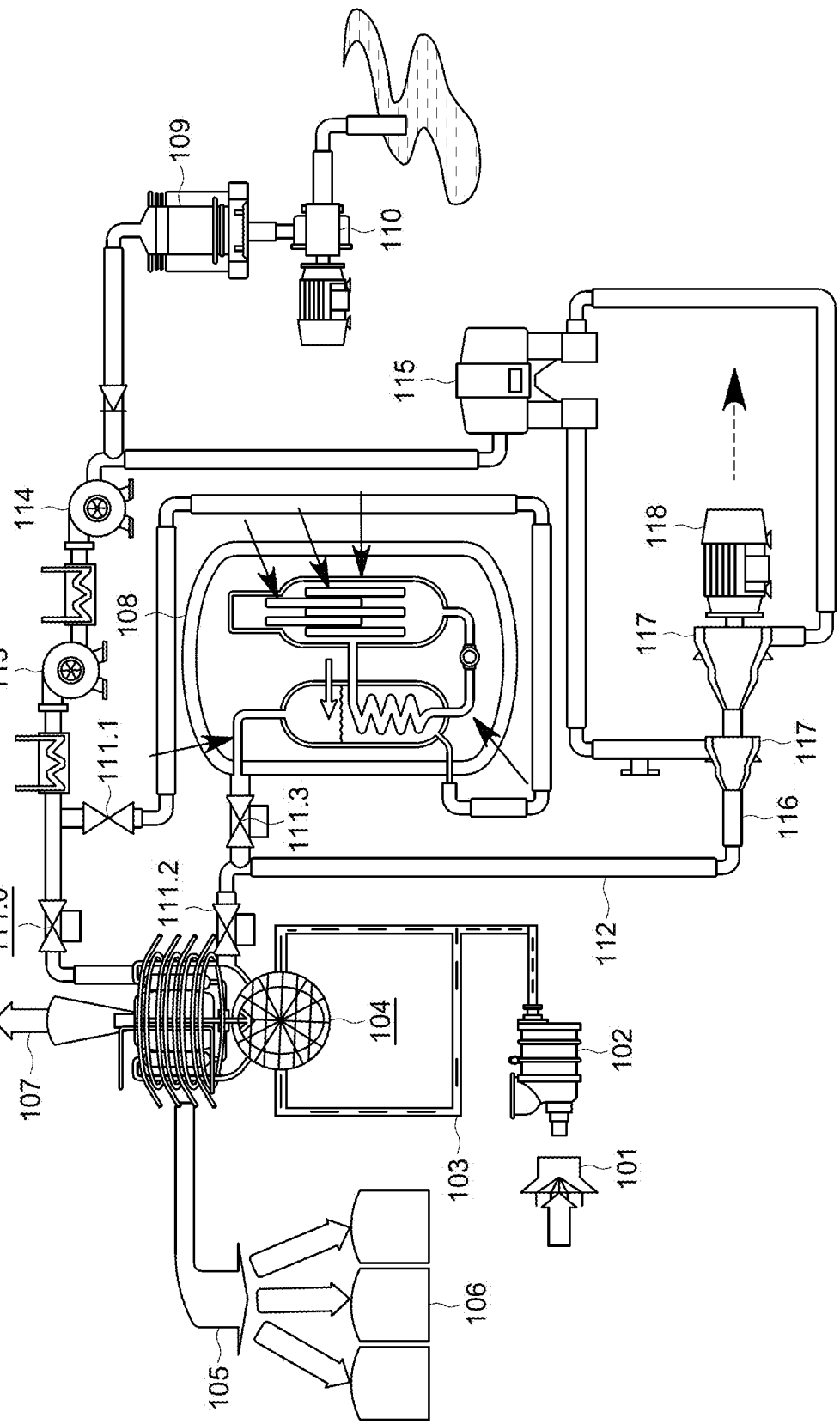
FIG. 1 depicts a schematic flow for an electromagnetic plasma separator (EMPS) facility.

Currently, Carbon Dioxide ($CO_2$) removal from the atmosphere may be separated from other components in a gas stream. Typically, when the gas stream contains a high amount of $CO_2$, the stream may be cooled to obtain liquified $CO_2$. When the amount of $CO_2$ is low, membrane separation or adsorption methods are applied to increase the $CO_2$ content prior to cooling. In some methods, carbon dioxide from a gas mixture is recovered by using membrane separation and distillation wherein each step is performed with temperature and pressure adjustments before each membrane and distillation process. Alternatively, filters may be used which absorb the $CO_2$ and then a solution is washed over the filters removing the $CO_2$ which is then collected.

Deficiencies associated with the above-mentioned processes include (1) The existing methods do not remove all greenhouse gases. (2) The approaches are very expensive to collect $CO_2$. (3) The existing methods only extract a small amount of the excess $CO_2$ in the Earth's atmosphere as the approaches do not scale. Finally, (4) The power needed to operate the extraction methods utilize other sources, such as, gas, and thus may contribute to global warming rather than helping.

In view of the deficiencies in existing approaches, there is a need for an improved, scalable, energy efficient approach to remove greenhouse gases from the atmosphere. Disclosed is a method, system, and apparatus for removing toxic elements and molecules from impure gases and reconstituting clean gases in the atmosphere.

The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. The embodiments used herein are not meant to be used to limit the scope of the description. As used throughout this application, the word "may", is used in a permissive sense (i.e., meaning having the potential to), rather than the mandatory sense (i.e., meaning must). Corresponding reference numerals indicate corresponding parts throughout the drawings.

In view of the limitations of the prior arts as discussed above, an approach is disclosed that removes greenhouse gasses from the atmosphere utilizing equipment that is self-sufficient, provides energy for itself and can send excess power back into the grid. In addition, the approach may scale to process gigatons of air every year, rather than megatons.

Accordingly, an Electro-Magnetic Plasma Separator (EMPS) is disclosed that is configured to separate superheated gas plasma and allows elements and molecules therein, to be removed and thereafter stored and/or reconstituted upon release. Air may be drawn into the system using large commercial induction fans. The air passes through a series of filter banks to remove any larger pollutants, such as, black carbon. The filter banks are designed to filter anything that could disrupt the system. Once the air is filtered it enters a large multistage axial compressor, these compressors generally achieve a compression ratio of 30:1. The filtered compressed air is then passed directly into the plasma combustor, this is a chamber designed to withstand extreme temperatures, using a series of high-powered plasma torches, a plasma arc is created which the air passes through and is heated to at least 8000 degrees Kelvin. At 8000 degrees Kelvin, the atoms and the molecules in the air ionize, meaning they gain and lose electrons and become positively or negatively charged.

The EMPS is designed to self-generate once it reaches the 8000 degrees Kelvin. In order to achieve the 8000 degrees Kelvin, in an embodiment, a boiler is utilized to produce steam, spin the turbines, and generate electricity. To heat the boiler for the initial steam generation, a heat recovery steam generator (HRSG) may be used to begin the startup process. An HRSG is a gas turbine that can produce heat and electricity. One or more HRSGs can power the plant and produce the steam required to begin the startup process. These pieces of equipment can be purchased 'off the shelf' and each turbine can produce up to 100 gw/hr of electricity every year. Four of these HRSG systems would produce enough steam and electricity and serve as backup equipment in case of maintenance and failures. However, the issue with gas turbines is they usually run on natural gas. The natural gas when burnt produces methane ($CH_4$), which would interfere with a goal of remaining carbon negative.

In another embodiment, a miniature nuclear reactor may be used to achiever the 8000 degree Kelvin or 13940.33 degrees Fahrenheit start up temperature. The miniature nuclear reactor is a more specialized piece of equipment that would require significant oversight and approval, but is carbon neutral, produces large amounts of steam, and in the long term is cheap to operate. Nuclear reactors produce steam through a process called nuclear fission, which involves splitting the nucleus of an atom. Utilizing a nuclear reactor for startup and back up is a preferred embodiment due to its carbon neutral footprint.

In an embodiment of an Atmosphere Processing Plant (APP) and an EMPS, containment of superheated plasma is achieved through a meticulously engineered approach that employs advanced materials and innovative design principles. Operational integrity and durability is supported under extreme conditions, leveraging the properties of selected materials such as graphene and tungsten, and employing a multi-layered protection strategy. The containment of superheated plasma is achieved through a meticulously engineered approach that leverages properties of advanced materials such as graphene and tungsten. These materials are employed in a multi-layered protection strategy to ensure operational integrity and durability under extreme conditions.

Graphene is incorporated for its exceptional thermal conductivity, tensile strength, flexibility, and chemical inertness. Graphen plays a pivotal role in managing thermal loads and maintaining structural integrity against the mechanical forces exerted by plasma. Tungsten, chosen for its high melting point and thermal conductivity, is used in areas exposed to direct plasma interaction, ensuring long-term durability and system efficiency.

The EMPS utilizes magnetic containment to create a magnetic "cage" for plasma confinement, thereby enhancing system longevity and operational safety. Active cooling systems employing liquid metals efficiently manage thermal loads, ensuring the stability of containment materials and superconducting magnets. During development, extensive theoretical simulations and small-scale testing may be used to enable risk-free design refinement and empirical validation of system behaviors under various operational conditions. This comprehensive strategy, grounded in advanced materials science and engineering innovation, underscores the EMPS's capability to separate and repurpose elements efficiently from input gases, marking a significant advancement in atmospheric purification technologies.

The EMPS technology represents a transformative approach to mitigating climate change by selectively removing greenhouse gases from the atmosphere. The environmental impact assessment, supported by comprehensive simulations and theoretical models, suggests a significant reduction in the carbon footprint. The EMPS can reduce atmospheric greenhouse gas levels by extracting millions of tons of $CO_2$ annually and thousands of tons of methane ($CH_4$), contributing to global efforts to improve air quality and combat global warming. Detailed simulations indicate that, with full-scale deployment, the EMPS could reduce global atmospheric $CO_2$ levels by a measurable percentage over a decade, significantly contributing to the goals set forth in international climate agreements such as the Paris Agreement. Theoretical models project the long-term environmental impacts of widespread EMPS deployment. These models take into account various scenarios of industrial adoption, urban implementation, and integration with existing carbon capture and sequestration efforts. Projections show a potential for notable improvements in air quality, particularly in urban areas with high industrial emissions, leading to decreased health risks associated with air pollution.

The EMPS employs selective ionization and magnetic separation processes that target specific greenhouse gases. By adjusting operational parameters, the system can be optimized for extracting $CO_2$, $CH_4$, and other potent greenhouse gases like Nitrous oxide ($N_2O$), offering a versatile tool to balance atmospheric compositions. To ensure the sustainability of the EMPS operation, efforts have been made to power the system using renewable energy sources wherever possible. This integration reduces the EMPS's carbon footprint, ensuring that the process of greenhouse gas removal does not contribute further to carbon emissions. By improving air quality, the system supports healthier ecosystems, promotes biodiversity, and aids in the recovery of natural habitats adversely affected by air pollution.

The data generated by EMPS operations can provide valuable insights into the dynamics of atmospheric greenhouse gases, informing climate science and influencing environmental policy. This information can help shape more effective climate action plans and encourage the adoption of similar technologies on a global scale. Reducing greenhouse gas concentrations and improving air quality directly benefits public health by decreasing the prevalence of respiratory and cardiovascular diseases associated with air pollution. Moreover, the EMPS's contribution to mitigating climate change can help prevent the social and economic disruptions predicted by unchecked global warming. The EMPS technology represents a significant advancement in the fight against climate change, offering a sustainable, effective means of reducing atmospheric greenhouse gas levels. By leveraging detailed environmental impact assessments, targeted removal technologies, and integration with renewable energy, the EMPS stands as a pioneering solution with the potential to make a meaningful difference in global environmental health.

The plasma combustor is the heart of the EMPS, responsible for heating incoming air to a plasma state. It employs a series of high-intensity plasma torches that ionize the air by elevating its temperature to at least 8000 degrees Kelvin. The combustor's interior is lined with a composite material blending graphene and tungsten, optimizing it for thermal management and structural integrity.

The superconducting magnets employ materials such as niobium-tin (Nb3Sn) or niobium-titanium (NbTi). These magnets operate at cryogenic temperatures to achieve superconductivity. This drastically reduces electrical resistance, enabling magnetic solid fields with minimal energy consumption.

The arrangement of magnets can be adjusted to modify the magnetic field's shape and strength, accommodating various plasma densities and compositions. This adaptability is used to optimize the separation process for different gases.

The EMPS incorporates a sophisticated heat exchanger arrangement designed to cool the superheated plasma generated during the gas separation efficiently. This system plays a pivotal role in maintaining operational temperatures and enhancing the system's overall energy efficiency.

The heat exchanger arrangement has a series of conduits and chambers through which the plasma, post-separation, is directed. These components are constructed from materials optimized for high thermal conductivity and resistance to high temperatures, such as advanced alloys incorporating graphene. This allows for rapid heat transfer from the plasma to the coolant without compromising the system's structural integrity. As the plasma passes through the heat exchanger, its temperature significantly decreases, transitioning from a plasma state to a gaseous state. This cooling process is critical for safely handling and potentially repurposing the separated gases. Parallel to plasma cooling, the heat exchanger arrangement harnesses the thermal energy extracted from the plasma to generate power. The system directs the absorbed heat towards a secondary circuit containing a working fluid, typically water. Thermal energy converts the water into superheated steam, which is then channeled to drive turbines and generate electricity. This process contributes to the EMPS's energy efficiency and aligns with sustainability objectives by utilizing waste heat for power generation.

The conversion of condensate back to superheated steam within the power generation side of the EMPS exemplifies the system's innovative approach to energy management. After powering the turbines, the steam condenses back into water. This condensate is then recirculated back through the heat exchanger arrangement, where it absorbs thermal energy from the cooling plasma, completing the cycle. This closed-loop system maximizes thermal energy utilization, significantly reducing the overall energy demand of the EMPS and contributing to its environmental sustainability.

Incorporating the heat exchanger arrangement into the EMPS provides several key benefits. The benefits include reducing thermal waste through efficient energy recycling, enhancing system safety by managing the temperatures of superheated plasma, and contributing to the system's power sustainability. This innovative integration of cooling and power generation mechanisms underscores EMPS's role as a cutting-edge solution in atmospheric purification technologies.

To manage the immense heat generated by the plasma combustor and contained by the magnetic system, the EMPS incorporates an advanced active cooling system. This system circulates coolants, such as liquid helium for the superconducting magnets and gallium-based liquid metal for general thermal management, through strategically placed channels and heat exchangers.

The technological advancements include (1) Graphene-enhanced Coolants: By integrating graphene nanoparticles into the liquid metal coolant, the system benefits from improved thermal conductivity, enabling more efficient heat transfer from the hottest parts of the EMPS to the heat exchangers. (2) Dynamic Flow Control: The cooling system is equipped with sensors and actuators that dynamically adjust the flow rate and path of the coolant based on real-time temperature data, ensuring optimal cooling performance under varying operational conditions.

The EMPS is designed to be highly adaptable, with configurable settings for plasma intensity, magnetic field parameters, and cooling flow rates. This flexibility allows the system to efficiently process air with varying levels of pollution or different compositions of greenhouse gases. By optimizing the operation of the EMPS for specific environmental conditions, it's possible to maximize the extraction of pollutants while minimizing energy consumption. This targeted approach enhances the system's efficacy in combating air pollution and contributes to its sustainability.

The EMPS is designed with integration in mind and can seamlessly connect with existing industrial processes and atmospheric monitoring systems. Given the high-energy processes involved in plasma separation, the EMPS incorporates advanced safety measures and protocols.

Graphene is incorporated for its exceptional thermal conductivity (approximately 5,000 W/m·K), enabling effective heat dissipation and management of thermal loads. Its high tensile strength, exceeding 130 GigaPascals, ensures structural integrity against the mechanical forces exerted by plasma. Graphene's flexibility and light weight contribute to the versatile and efficient design of containment structures, while its chemical inertness and electromagnetic transparency are critical for maintaining stability in aggressive plasma environments.

Tungsten, with the highest melting point of any metal (3422° C.), reinforces the combustor's ability to withstand prolonged exposure to extreme temperatures, making it an ideal candidate for areas of the system exposed to direct plasma interaction. Tungsten's excellent thermal conductivity aids in heat management, while its mechanical properties and chemical stability under high-temperature conditions ensure long-term durability. The engineering and operational knowledge surrounding tungsten, drawn from its use in aerospace and fusion reactors, informs the design optimization and risk mitigation strategies of our system. Its excellent thermal stability ensures the combustor's structure remains intact under the harsh conditions of plasma generation.

The magnetic containment system guides and maintains the plasma within defined boundaries using superconducting magnets following ionization. This system creates a magnetic "cage" that confines the plasma, allowing for precise manipulation and separation of its constituents based on their magnetic properties. The magnetic containment system employs superconducting magnets to create a magnetic "cage" that confines plasma without physical contact, thereby avoiding material degradation. This method offers precise control over plasma behavior, enhances system longevity, and reduces thermal stress on containment materials. The scalability and energy efficiency of superconducting magnets contribute to the system's overall effectiveness and sustainability.

The active cooling systems with liquid metals, like gallium or sodium, are integrated to manage the thermal loads efficiently. These systems provide a dynamic cooling solution that maintains the operational temperatures of both the containment materials and the superconducting magnets, ensuring stability and prolonging the lifespan of the system components.

The multi-layer protection combines materials with complementary properties to form a composite shield, offering thermal insulation, structural support, and radiation shielding. This modular and adaptable approach enhances the system's safety and allows for easy maintenance and upgrades, ensuring that the containment system remains at the forefront of technological advancements.

The development process may incorporate extensive theoretical simulations to predict system behavior under various operational conditions, enabling risk-free design refinement. Small-scale testing validates these simulations, providing empirical data to inform further design iterations. This combination of simulations and testing ensures that the disclosed approach is grounded in both theoretical and practical understandings of plasma containment, leading to a robust, efficient, and scalable solution.

This comprehensive strategy, grounded in advanced materials science and engineering innovation, provides a solid foundation for the containment of superheated plasma. The disclosed approach is characterized by its non-experimental, proven methodologies, ensuring reliability and effectiveness in long-term operation.

Figure 18:
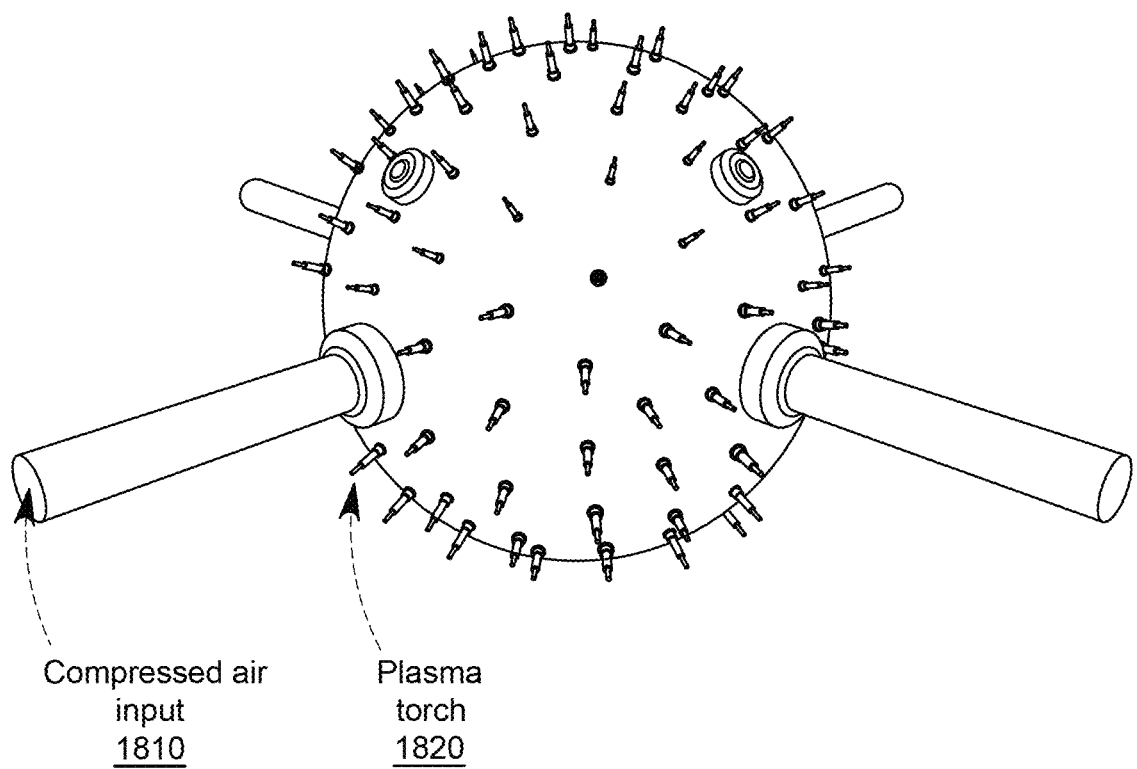
FIG. 18 depicts an external view of plasma combustor without plasma torch pipework.
Figure 19:
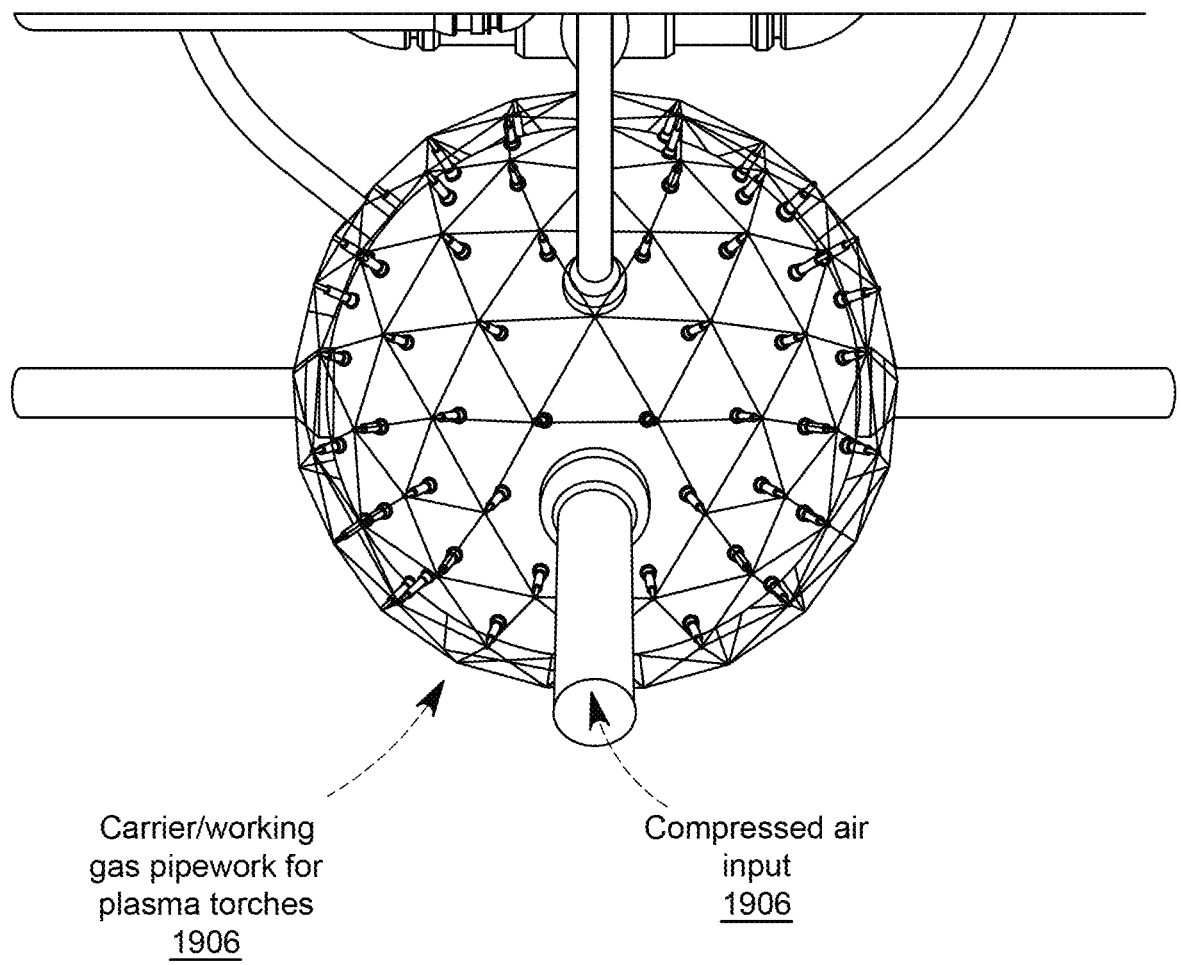
FIG. 19 depicts an external view of plasma combustor with plasma torch pipework.
Figure 20:
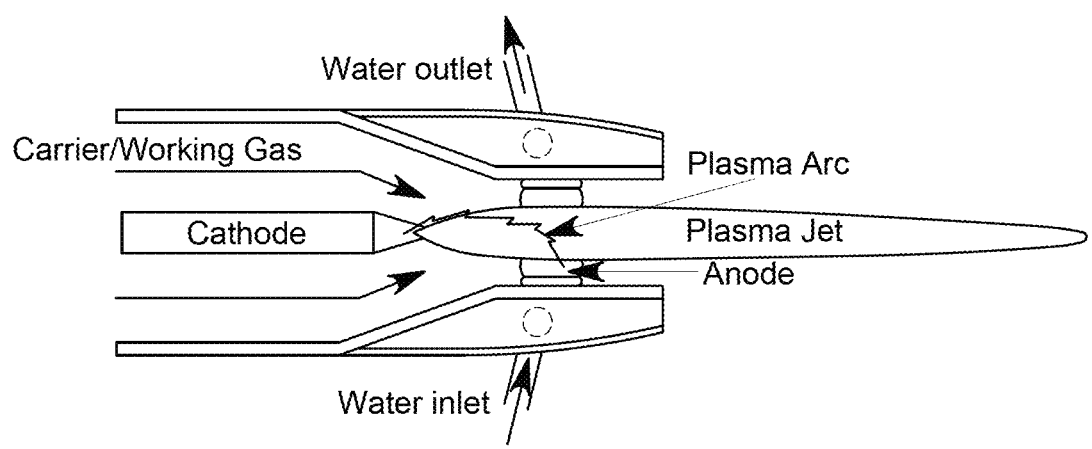
FIG. 20 depicts a view of a plasma torch.

The heat generated by the nuclear reaction creates steam which drives power and spins the turbine and generators. This initial power source powers the plasma combustor. The plasma combustor is a sphere made of highly heat-resistant materials at equal points around the sphere. FIGS. 18-20 depict the plasma torches. These plasma torches are powered by the plant and fed the filtered compressed air. The air is used as the working gas. These torches work in unison to create extreme temperatures as the compressed, filtered air from the Axial Compressors enters the Plasma Combustion chamber, the air almost instantly changes state into a gas plasma, because of the high heat and pressures. The gas plasma then enters the EMPS and then can be separated. The nuclear reaction process can then be held as the plant will be self-powered by the plasma closed loop system.

One of the highest heat-resistant materials currently known is a class of materials called refractory metals. Refractory metals exhibit exceptional heat resistance due to their high melting points and excellent mechanical properties at elevated temperatures. Some of the most notable refractory metals include:

Tungsten (W): Tungsten has the highest melting point of any metal, at approximately 3,410 degrees Celsius (6,170 degrees Fahrenheit). It exhibits excellent stability and retains its strength at high temperatures.

Rhenium (Re): Rhenium has the third-highest melting point of any element, at about 3,180 degrees Celsius (5,760 degrees Fahrenheit). It has excellent resistance to creep deformation at high temperatures.

Molybdenum (Mo): Molybdenum has a relatively high melting point of approximately 2,620 degrees Celsius (4,750 degrees Fahrenheit). It exhibits good thermal conductivity and is often used in high-temperature applications.

Tantalum (Ta): Tantalum has a melting point of around 3,020 degrees Celsius (5,470 degrees Fahrenheit). It has excellent corrosion resistance and is often used in chemical processing and high-temperature applications.

Niobium (Nb): Niobium has a melting point of approximately 2,468 degrees Celsius (4,474 degrees Fahrenheit). It is commonly used in the aerospace and nuclear industries due to its good mechanical properties at high temperatures.

These refractory metals are often used in specialized applications where extreme heat resistance is required, such as in aerospace propulsion systems, nuclear reactors, furnace components, and high-temperature furnaces. However, it's worth noting that the practical use of these materials is often limited by factors such as cost, availability, and specific application requirements.

The gas plasma continues around the system and then enters the EMPS which is made up of a series of highly pressurized pipework, superconducting magnets, heat exchangers and an exhaust. The EMPS is monitored and controlled with automation software, pressure sensors, heat sensors, safety cutoff valves, safety relief valves, pressure sensors, heat sensors, safety cutoff valves, safety relief valves and is continually monitored from a control room by plant operators. At these temperatures the gas plasma is extremely susceptible to magnetic forces.

The EMPS may be designed such that it can be implemented in a relatively tall external structure having a height of approximately 1500 ft, with intakes able to draw up to a Gigaton of air per year.

The plasma combustor (PC) is what turns the compressed air into plasma. The PC is a large sphere made of heat-resistant materials. Built around the sphere are evenly distributed ports, each port contains a plasma torch arrangement which is powered by the plant's power generation process. For plasma torches to reach the required heat, a working gas is used. Compressed air is already available as part of the cleaning process and is used as the working gas.

The PC is a sphere made of highly heat-resistant materials. At equal points around the sphere are plasma torches powered by the plant which is fed the filtered compressed air. The air is used as the working gas. These torches work in unison to create extreme temperatures as the compressed, filtered air from the Axial Compressors enters the Plasma Combustion chamber. When the air enters, it almost instantly changes state into a gas plasma, because of the high heat and pressures. When the air enters the EMPS as a gas plasma, the contents of the gas plasma can then be separated. The nuclear reaction can then be stopped as the plant will be self-powered by the plasma closed loop system.

The gas plasma passes through several superconducting magnets, of which are designed to divert flow into varying waste element pipes. The magnets achieve this by having electrical current passed through them at varying voltages, the increased voltage increases the strength of the magnetic field. The voltage may be controlled with a power supply capable of providing the necessary current and voltage to the magnet. In an embodiment, the system is configured to allow automated sensing to determine values for the adjustment of the voltage to a superconducting magnet. The power supply must be capable of providing a stable and precise current to the magnet to ensure that it operates within its design limits. Current leads connect the power supply to the superconducting magnet. These leads must be designed to handle the high currents and low temperatures typically associated with superconducting magnets, typically below 10 Kelvin (−263.15° C.). In an embodiment, the cryogenic system supports superconducting magnets which operate at very low temperatures, typically below the boiling point of liquid helium (4.2 Kelvin, −268.95° C.). The cryogenic system runs in the middle of the magnets and are internally cooled, this improves efficiency and prevents cross system contamination. Equipment capable of measuring the voltage of the superconducting magnet is required to adjust its voltage accurately. This equipment should be capable of measuring the voltage across the magnet and the power supply with high precision. Artificial Intelligence and machine learning software may be implemented to automatically adjust and operate the required equipment, this would eliminate human error and the equipment will become more efficient over time.

Magnetic field lines connecting different plasma populations act as channels for the transport of plasmas, currents, electric fields, and waves between the two environments. In this way, the two plasmas become coupled electromagnetically to one another. Magnetic field lines cannot move through the plasma without generating electric forces that resist the motion. So the charged particles are "stuck" to the magnetic field lines and can only move along them, as when an electric current flows in the plasma. The importance of being able to control the magnetic field strength is key to the operation of the plant. When air ionizes, the elements have their own unique magnetic field range, using this magnetic field each element can be pulled apart and separated. That is, each greenhouse gas element such as carbon dioxide, methane and nitrous oxide can be separated with near perfect efficiency. As the waste elements are separated they are removed from the main system by their relevant magnet and travel down their unique element pipe where they are cooled and stored in individual industrial storage tanks ready for processing, refining and reuse. What is left in the main system is now a combination of oxygen, nitrogen and trace elements such as argon, krypton, helium, but these elements are still in their gas plasma state, so to cool and reconstitute the elements they are passed through a heat exchanger arrangement.

Most materials which are in gaseous state at ambient pressure and temperature are supplied in the form of compressed gas. The gas is compressed into pressure vessels for storage (like tube trailers, gas cylinders, or gas canisters) using a gas compressor through a piping systems. Gas cylinders are most commonly used for gas storage, with large numbers being produced at "cylinder fill" facilities.

However, all of the industrial gases are not supplied in gaseous phase. Some gases are vapors, liquification for which can be done under pressure alone at ambient temperature, so these gases can be supplied in the form of a liquid in a suitable container. These gases are useful in the form of ambient refrigerants owing to this phase change. The well-known industrial gases having this property are—sulfur dioxide, butane, propane, and ammonia.

When the ambient air is heated to at least 8000 degrees Kelvin via the plasma combustor the gas plasma passes through the EMPS. The EMPS is made up of a magnetic core with several superconducting magnetic rings. Gas plasma in this state is highly susceptible to magnetic forces, using a series of pipework and electro-superconducting magnets, the system can remove individual elements from the gas plasma stream. When in the gas plasma state each element has its own individual magnetic range, and each waste pipework is constructed with a series of electromagnets around the circumference. As the plasma stream passes over the magnets the targeted element, e.g. methane is then stripped from the stream and forced into its own 'waste' pipework. Each waste pipework is wrapped in superconducting magnets set at the same wattage to attract the waste element, this is to ensure the plasma is indefinitely pulled away from the stream. Once in the waste pipework, the plasma is cooled rapidly returning to its natural gas state. Once in this state it can be stored.

Voltage is used to control the strength of the magnetic field for the individual magnets. The voltage is increased or decreased as needed to precisely set each waste pipe and electromagnet array so it separates the individual elements with high precision and efficiency.

As the gas plasma travels past each individual waste pipe and magnet array, it is removed from the stream, which means the system can remove greenhouse gas elements such as carbon dioxide, methane, and nitrous oxide from the plasma stream. The remaining oxygen, nitrogen, and trace elements will be left in the main system.

Once the waste elements have been removed from the plasma stream, they cool rapidly and return to their natural gas state. These gases may be reused in various applications such as synthetic fuel production, and in medical and industrial applications.

These gases are pumped, compressed, transferred, and stored at safe pressure and temperature in industrial-scale storage tanks for processing and reuse. The concentration, temperature, and pressure of the gases can be checked using commercially available sensors and digital readouts.

The heat exchanger is part of a closed loop steam turbine system that powers the plant and provides power to the grid, powering homes and businesses in the regions where these systems are built. The two systems, although they work together, are never in direct contact with one another. Cooling feed water is pumped into the heat exchangers, the gas plasma passes over a series of coils which contains the feed water which simultaneously cools the gas plasma on one side of the system and then superheats the steam on the other side driving it towards a steam driven turbine. The steam spins the turbine, which in turn powers a generator creating electricity. As the steam naturally cools and loses its momentum it then turns back into water and is pumped back around the system, creating a closed loop steam power generation system. The gas plasma is now cooled to its ambient temperature and is reconstituted creating what is essentially purified air. Thus purified air has all of its greenhouse gases removed and may then be released back into the atmosphere via the exhaust.

To cool the plant and produce steam a water source is used. In an embodiment, the plant may be constructed close to a significant water source, such as, a sea or a lake.

The water is pumped from using a commercial water pump to a treatment plant, the treatment plant removes all impurities to prevent corrosion to the pipe's internals and produce efficient steam.

The superconducting electromagnets are electrically powered and their magnetic field strength can be increased or decreased by increasing or decreasing the wattage of the individual magnets.

The important industrial gases are bulk produced and delivered by pipeline to customers. However, they can be packaged and then transported.

Most of the gases are sold inside gas cylinders and a few gases are sold in the form of liquid inside suitable containers or in the form of bulk liquid that's delivered by truck. Originally, the industry supplied gases within cylinders to prevent any necessity for generation of gas locally. However, for large customers like oil refineries or steelworks, a large-sized gas production plant can be built nearby (known as "on-site" facility) for avoiding the use of cylinders in large numbers manifolded together.

There are different types of storage tanks in industries available. The type of industrial gas storage tank required by a plant depends on several factors including the holding capacity, measurement, and shape of the container.

The most common types of industrial tanks include an internal floating roof (IFR) storage tank employed for liquids having lower melting points like gasoline and ethanol. These tanks have a cone shape with a floating roof within. The roof suspended within the storage tank moves along the level of the fluid, i.e., with the increase of the liquid, the roof moves up and with the lowering of the liquid, the roof goes down. If the tank has no liquid, the roof of the tank is held by the legs on which it is placed.

Bullet tanks are sphere and flat-shaped industrial storage tanks used mostly in large plants. These types of tanks are usually preferred over the other types to store liquefied gases like butane and ammonia for which the melting point is very low and typically store liquids at a temperature below −148 degrees Fahrenheit. These types of tanks mostly have the ability to hold huge amounts of gases that range from 5,000 to 30,000 gallons. Additionally, they can be installed horizontally as well as vertically. A unique characteristic of bullet tanks is that they have the ability to hold fuel as well as other additives required for the operation of the plant.

Liquefied natural gas (LNG) storage tank is used to store liquefied natural gas. These types of storage tanks in industries are available in LNG carriers, in ground, or above ground. LNG storage tanks have the characteristic of being able to hold LNG at the extremely low temperature −162° C. These tanks have double containers—the inner container holds LNG whereas the outer one holds insulation materials. The full containment storage tank makes the most common type of tank. Roughly, the diameter of such a tank is 75 m and the height is 55 m (180 ft.). If the LNG vapors aren't released in such tanks, the temperature and pressure inside the tank would keep on rising. Being a cryogen, Liquefied Natural Gas is stored in its liquid form at extremely low temperatures. The temperature inside these tanks would stay constant in case the pressure is maintained as constant by releasing the boiled off gas from the tank. Such phenomenon is referred to as auto-refrigeration.

Compressed Natural Gas (CNG) and Liquefied Natural Gas (LNG) are often confused with each other. Both are natural gas in stored form. The chief difference between the two is that Compressed Natural Gas is stored at high pressure and ambient temperature, whereas Liquefied Natural Gas is stored at ambient pressure and low temperature. Under their respective conditions of storage, CNG is supercritical fluid and LNG is liquid. The cost of storage and production is lower for CNG than LNG since it doesn't need cryogenic tanks and a costly cooling process. However, for CNG, much larger volume is required for storing an energy equivalent of petrol or gasoline as well as extremely high pressures (205 to 275 bar, or 3000 to 4000 psi). Due to this, Liquefied Natural Gas is often employed for the transportation of natural gas over long distances, in pipelines, trains, or ships, where conversion of the gas into CNG is done before distributing to an end user.

Several catastrophic storage tank failures have occurred in the past, one of them being the failure that happened on Jan. 14, 1919 at Boston in Massachusetts. This Boston molasses disaster occurred due to poor construction and design. The wall was too thin to withstand loads repeatedly from the contents. Testing of the tank had not been done before use by water fill up. The tank was poorly riveted also. Several other accidents have been caused by tanks, often resulting from sub-standard steel or faulty welding. Some more common problems around the seal of tanks have been resolved to some extent by new inventions. However, when empty, another problem is presented by storage tanks. If the tanks have been used for holding oil products or oil, like gasoline, the tank atmosphere may become highly explosive since the space is filled up with hydrocarbons. In such a situation, if welding operations are carried out, the contents can easily get ignited by the sparks, leading to catastrophic results for welders. This problem is quite like that of the empty bunkers over tanker ships, which now need to use inert gas blankets for preventing the building up of explosive atmospheres from the residues. So, industrial storage tanks of any type should be efficiently designed and constructed, adhering to all safety standards, and following all safety rules and regulations. They should also be maintained well, with quality and safety checks and inspections being conducted at regular intervals.

FIG. 1 depicts an embodiment of an Electro-Magnetic Plasma Separator (EMPS) system that is configured to separate super-heated gas plasma and allows elements and molecules therein, to be removed and thereafter stored and/or reconstituted upon release. In an embodiment, ambient atmospheric air is drawn into the system using industrial induction fans through a series of filter banks to remove any larger pollutants in the input air filter bank 101. After passing through the filter banks, the ambient atmospheric air enters a multistage industrial axial compressor 102. The industrial axial compressor 102 compresses the filtered atmospheric air increasing the pressure to around 10:1 to form compressed filtered air 103 The highly pressurized compressed filtered air 103 travels up through the system plasma combustor and EMPS 104. The compressed air first enters the plasma combustor in the plasma chamber where the pressurized air is ignited to at least 8000 degrees Kelvin using a series of plasma torches. that creates a gas plasma that then enters the EMPS. As the plasma travels through the EMPS, the plasma gas passes over a series of superconducting magnets that separate each element individually and processed separately. Waste gasses such as $CO_2$ and methane are individually separated and processed for storage leaving behind oxygen, nitrogen and trace elements. The remaining "clean" elements, which are still in their superheated plasma state, then enter the heat exchanger portion of the EMPS. Cooling water from the feed pumps 113 is fed directly into the heat exchangers. As the plasma enters cooling water passes over pipework containing the plasma, the two elements (plasma and cooling water) never physically touch as the systems are separate. The plasma is rapidly cooled reconstituting the remaining elements creating purified air that then heads to the exhaust back to atmosphere 107. The cooling water is rapidly heated creating superheated steam which is highly pressurized, this is then pumped towards the steam turbines 117. This superheated steam drives the turbines which spins the generator 118 creating electricity. The separated waste elements enter their respective pipework away from the main system, where they naturally cool back to their natural gas state for further processing, such as, waste elements to storage 105. The waste elements enter their individual industrial storage tanks for storage/reprocessing 106. These waste elements may be reprocessing to create synthetic fuels and to be used in medical, industrial and commercial applications. Other, clean, cooled elements may be released back to atmosphere via exhaust 107. The remaining "clean" elements are cooled in the heat exchangers and are naturally reconstituted to their original state minus any waste elements creating essentially purified air, this air is then released back to atmosphere via the exhaust 107. The nuclear reactor 108 may be used to create the initial steam generation. The control rods are pulled from the reactor which causes nuclear fission, this creates extreme heat. This heat is then used to create steam in the reactor's boiler unit, the steam reaches superheated temperatures and can drive the turbines. Once the power generation is high enough and the Plasma Combustor can operate efficiently the reactor is cut off from the system via the control valves (111.0 and 111.1) and the control rods are inserted in the reactor to control the steam generation. The water treatment plant 109 works in tandem with the natural source water pump 110. Fresh water is drawn in and is chemically treated to remove all impurities creating a PH neutral water. This water being pure is highly important as this enters the main cooling system, any impurities in the water can create rust and damage the pipe and equipment internals. The water is injected into the cooling system whenever it requires a top off to achieve optimal pressure and temperature. The control valves operate in tandem to switch between the nuclear reactor steam generation system and the EMPS steam generation system. When the reactor is operational and creating steam for power generation, valves 111.1 and 111.3 are open and 111.0 and 111.2 are closed. When the EMPS is starting, the steam values 111.0 and 111.2 are opened and 111.1 and 111.3 are closed. The values support separating the systems when required. The superheated steam return 112 is what spins the turbine, the generator, and creates power. The feed pump 113 drives the cooling water around towards the EMPS or the reactor boiler unit. The condensate pump 114 is part of the feed pump system. As steam loses heat, it turns back into water. Inevitably the steam begins to do this as soon as it leaves the boiler. The water which forms is known as condensate, which tends to run to the bottom of the pipe and is carried along with the steam flow. The condensate pump is designed to ensure the condensate is pumped through the pipework instead of sitting at the bottom. The condenser 115 helps maintain pressure in the system and converts the steam from the low-pressure (LP) turbine back into water which is then pumped around the steam system. A steam turbine governor control valve 116 is a component of the turbine control system that regulates rotational speed in response to changing load conditions. The governor output signal manipulates the position of a steam inlet valve or nozzles which in turn regulates the steam flow to the turbine ensuring steady flow and efficiency of steam. Low-pressure (LP) and high-pressure (HP) turbine 117 are driven by the system's superheated steam. The steam first enters the HP turbine, which is the main driver of the turbine, as the steam naturally cools, loses temperate and pressure it enters the low-pressure side of the turbine. The LP turbine blades have a much larger radius and surface area to capture any further steam, driving the turbine more. The turbine spins the generator 118, the generator is connected to the grid. As the generator is spun from the power of the turbine it converts the mechanical (kinetic) energy of the rotor to electrical energy.

Figure 2:
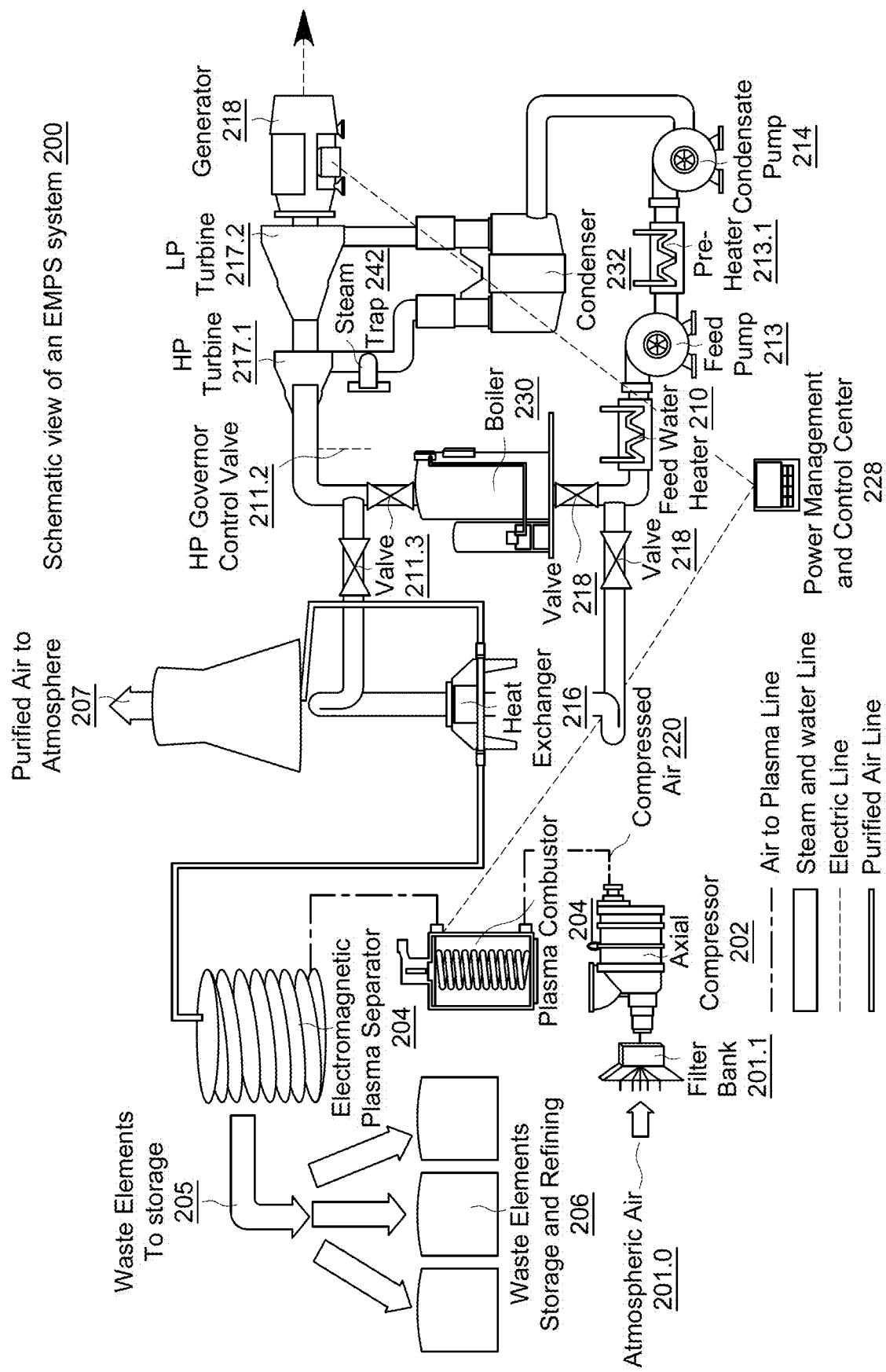
FIG. 2 depicts a schematic system view of EMPS.

FIG. 2 illustrates a structural representation of an embodiment of the electromagnetic plasma separator (EMPS). As shown in FIG. 2, atmospheric air 201.0 is brought into filter bank 201.1. Axial compressor 202 compresses the filtered air to produce compressed filtered air 203 which is brought into the plasma combustor 204.1 which heats the air as it enters the electromagnetic plasma separator 204.2 which separates individual element.

The separated elements may pass through the heat exchanger 216 and once cooled, the purified air is released to the atmosphere 207. The heat exchanger 216 may be connected to different heating systems via valves. The valves 211.0, 211.1, 211.2, and 211.3 control which heating system are being used. Clean and purified water enters feed water heater 210 may be sent to feed pump 213 which pre-heats 213.1 and goes through condensate pump 214 flowing through condenser 232. After going through boiler 230, the heated steam goes through high-pressure (HP) control valve 211.2, then HP turbine 217.1 feeding into low-pressure (LP) turbine 217.2 turning generator 218 which produces electricity. The power management and control center 228 controls the generator 218 and the electromagnet plasma separator 204.

In an embodiment, a high-pressure (HP) turbine 226 is connected to a low-pressure (LP) turbine 238 having a condenser 232, a heat exchanger unit 210, a magnetic core 208 and an exhaust unit 206. The condenser 204, the heat exchanger unit 210, the magnetic core 208 and the exhaust unit 206 are arranged in a closed-loop cooling system 218 feeding a liquid, typically water, wherein the turbine 202 receives power from the steam generated by the heat exchanger unit 210. The magnetic core 208 is arranged such that it receives super-heated dirty air or gas 214. When the dirty air or gas is superheated, it turns into plasma that needs to be treated for extracting clean gasses. The heated plasma at a very high temperature is susceptible to magnetic forces. Thus, when super-heated dirty gas or dirty plasma 214 is received by the magnetic core 208, the magnetic forces are applied to the waste elements of the dirty gas plasma. This results in the siphoning of the waste elements 212 from the heated gas plasma. The siphoned waste elements are discarded, and the clean filtered gas plasma is fed to the heat exchanger unit 210 for cooling. The heat exchanger unit 210 cools the filtered gas plasma and in this process, superheated steam is generated that is fed to the turbine 202. The turbine 202 feeds cool water to the heat exchanger unit 210 which helps in cooling the heated filtered gas. The cooled clean air is then fed to the exhaust unit 206 and is either collected to store or released into the atmosphere.

Thus, as explained above, the EMPS is set up to create a closed-loop steam cycle heat transfer using the heat exchanger unit 210 or the condenser 204 unit. The feed water from the turbine 202 is pushed around the primary heat exchangers, thereby cooling the superheated gas plasma, which then causes the feed water to turn into super-heated steam and is then driven towards a steam turbine 202 creating a power source. Further, the EMPS system according to the embodiments disclosed herein, allows super-heated air to be separated. when this process is carried out on a large scale then carbon dioxide, greenhouse gases such as methane and sulfur dioxides and other toxic elements from breathable air can be removed.

Figure 3:
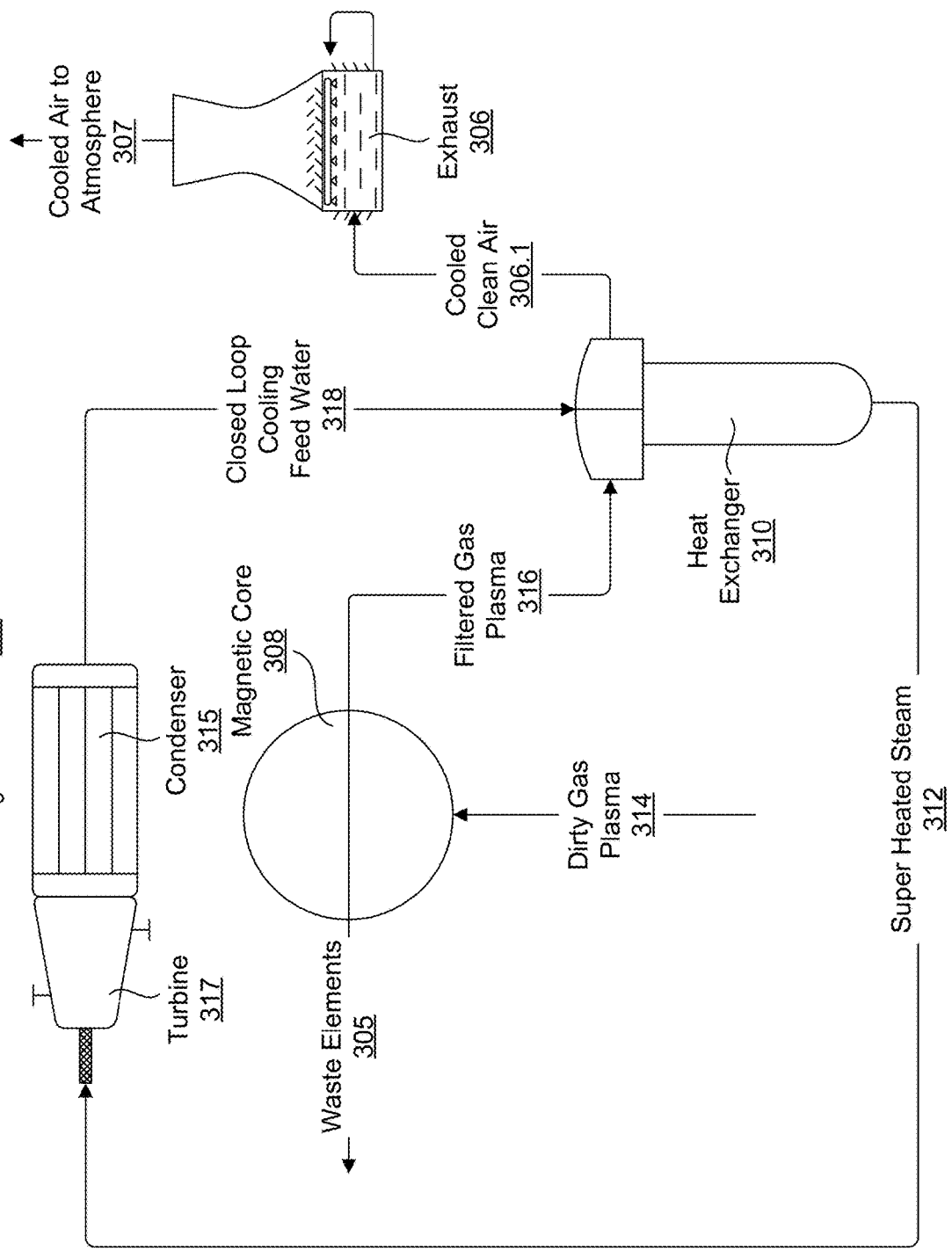
FIG. 3 depicts an initial power source (fission reactor)

FIG. 3 illustrates a flow of an embodiment of the electromagnetic plasma separator (EMPS). Dirty gas plasma 314 enters the system which includes magnetic core 308 which is used to separate element and expel waste elements 305. The filtered gas plasma 316 may exit the EMPS and enter the heat exchanger 310 passing the filtered gas plasma 316 through the heat exchanger 310. Super-heated steam 312 exits the heat exchanger 310 and enters the turbine 317 which is condensed by condenser 315 to form cooling feed water 318 as part of the closed loop cooling feed water. The filtered gas plasma 316 enters the heat exchanger 310 and exits as cooled clean air 306.1 going through the exhaust 306 becoming cooled air being released to the atmosphere 307.

Figure 4:
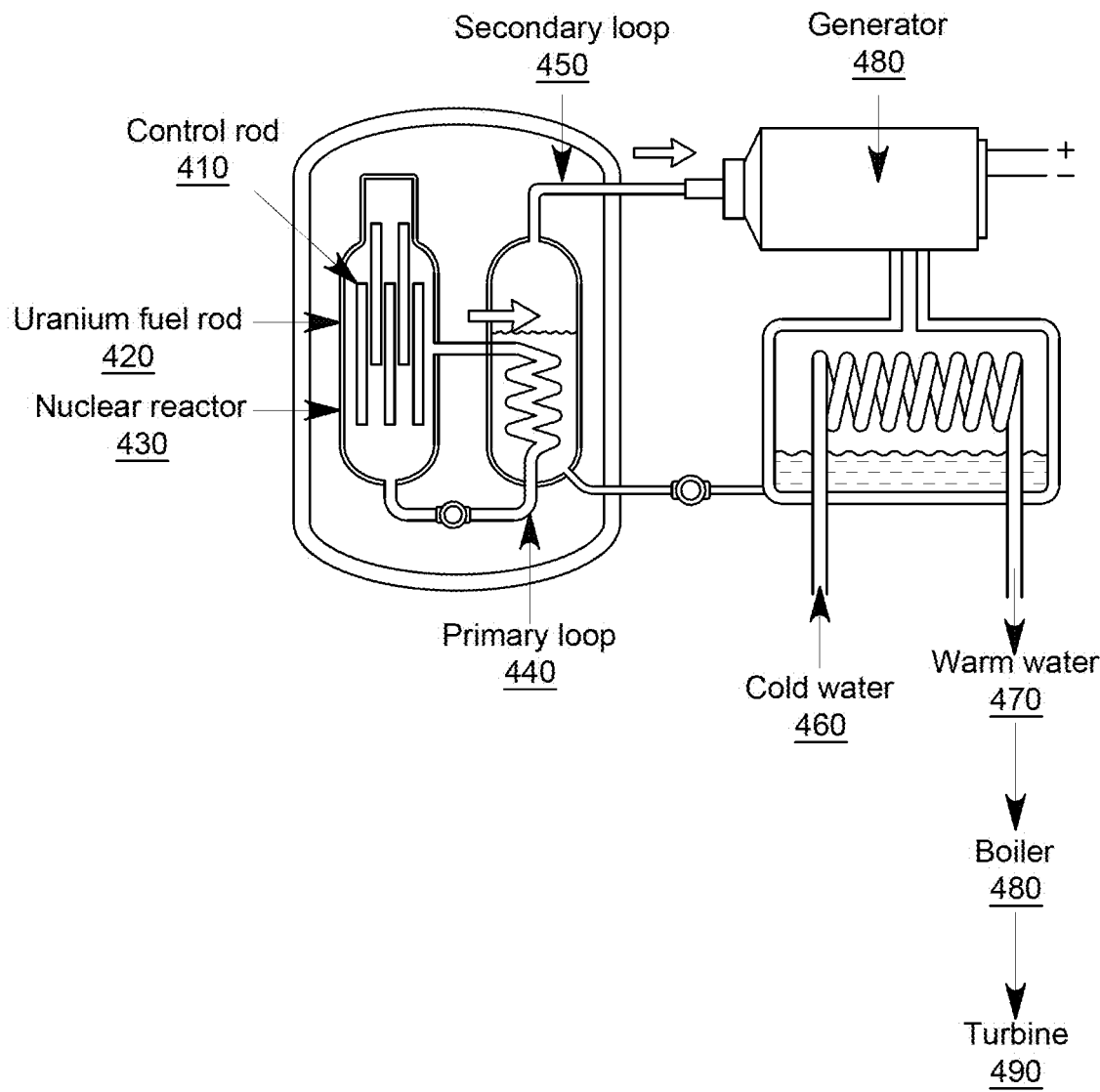
FIG. 4 depicts a schematic overview of facility with storage units and induction units.

FIG. 4 depicts an initial power source (Fission Reactor) 400. Control rod 410 along with uranium fuel rod 420 can be used to control the nuclear reactor 430. Cold water 460 is input into the primary loop 440 and output as warm water 470 entering boiler 480 and turbine 490. Warm water may also enter the secondary loop 450 which turns generator 455. Here's a simplified explanation of how it works: There are many 1. Fuel Rods: The reactor core contains fuel rods, typically made of uranium or plutonium. These fuel rods are composed of small fuel pellets that contain the fissionable material. 2. Fission: When a neutron is absorbed by a fuel atom, it becomes unstable and splits into two smaller atoms, releasing a large amount of energy. This process is called nuclear fission. The released energy appears as heat. 3. Heat Transfer: The heat generated by nuclear fission is transferred to a coolant, usually water, circulating through the reactor core. This heat transfer occurs through conduction and convection. 4. Coolant Circulation: The hot coolant absorbs the heat from the fuel rods and becomes pressurized and extremely hot. In pressurized water reactors (PWRs), the coolant remains in a liquid state even at high temperatures due to high pressure. 5. Steam Generation: The hot coolant is then passed through a heat exchanger called a steam generator. The heat from the coolant is transferred to a separate loop of water, which is converted into steam. In boiling water reactors (BWRs), the coolant directly produces steam in the reactor core. 6. Turbine Operation: The high-pressure steam produced in the steam generator is directed to a turbine. As the steam flows through the turbine, it expands and causes the turbine blades to rotate. 7. Electrical Generation: The rotating turbine is connected to a generator, which converts the mechanical energy from the turbine into electrical energy. This electricity can be used to power homes, businesses, and industries. 8. Condensation and Recirculation: After passing through the turbine, the steam enters a condenser where it is cooled and converted back into water. The condensed water is then pumped back to the steam generator to be heated again, completing the cycle. This process of heat generation, steam production, turbine operation, and electrical generation is known as a nuclear power plant's Rankine cycle. This is the same principle used in the EMPS power generation system.

Figure 5:
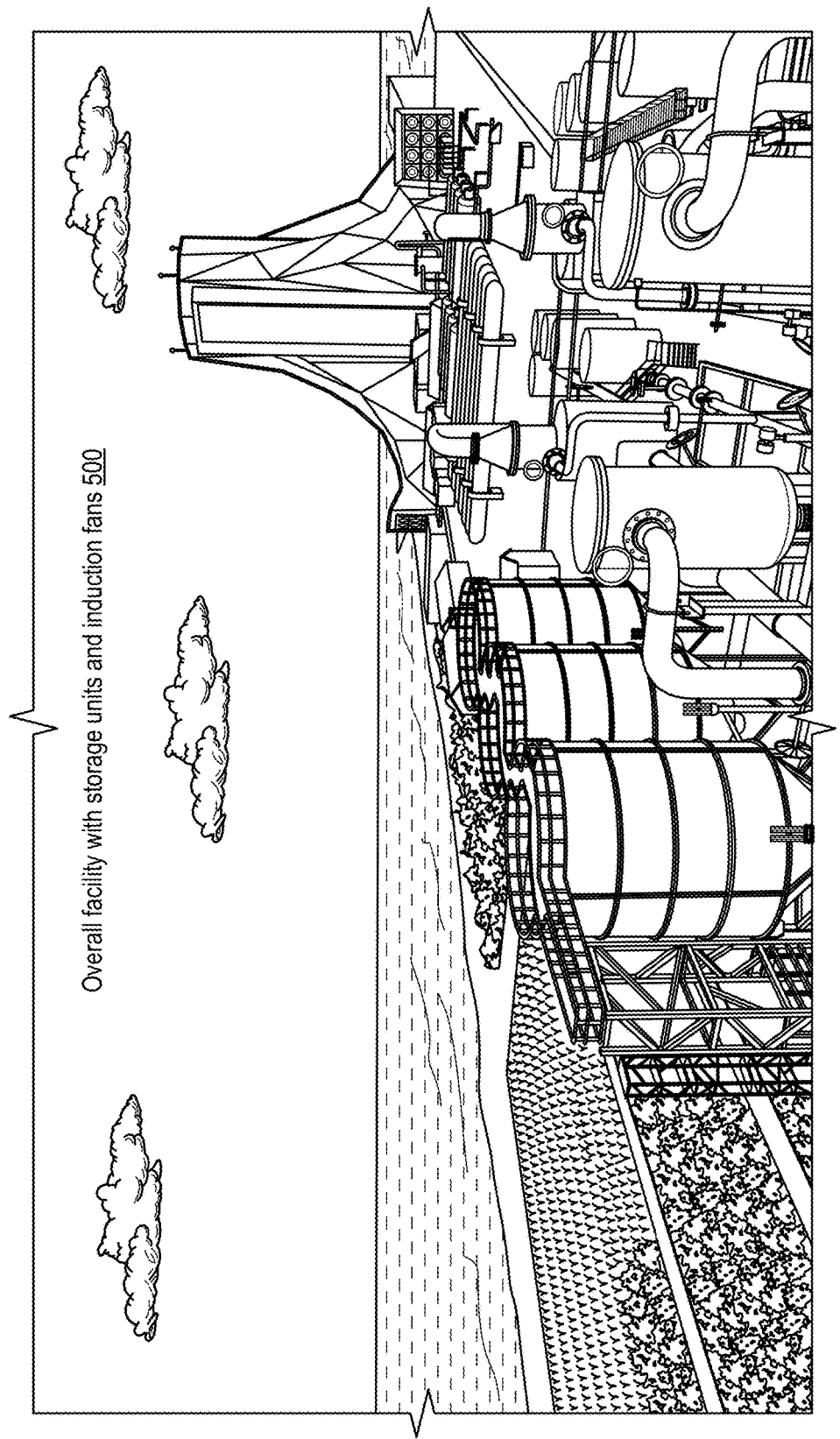
FIG. 5 depicts a rendition of an external view of overview of facility with storage units and induction units.

FIG. 5 depicts a rendition of an external view of overview of facility with storage units and induction units.

Figure 6:
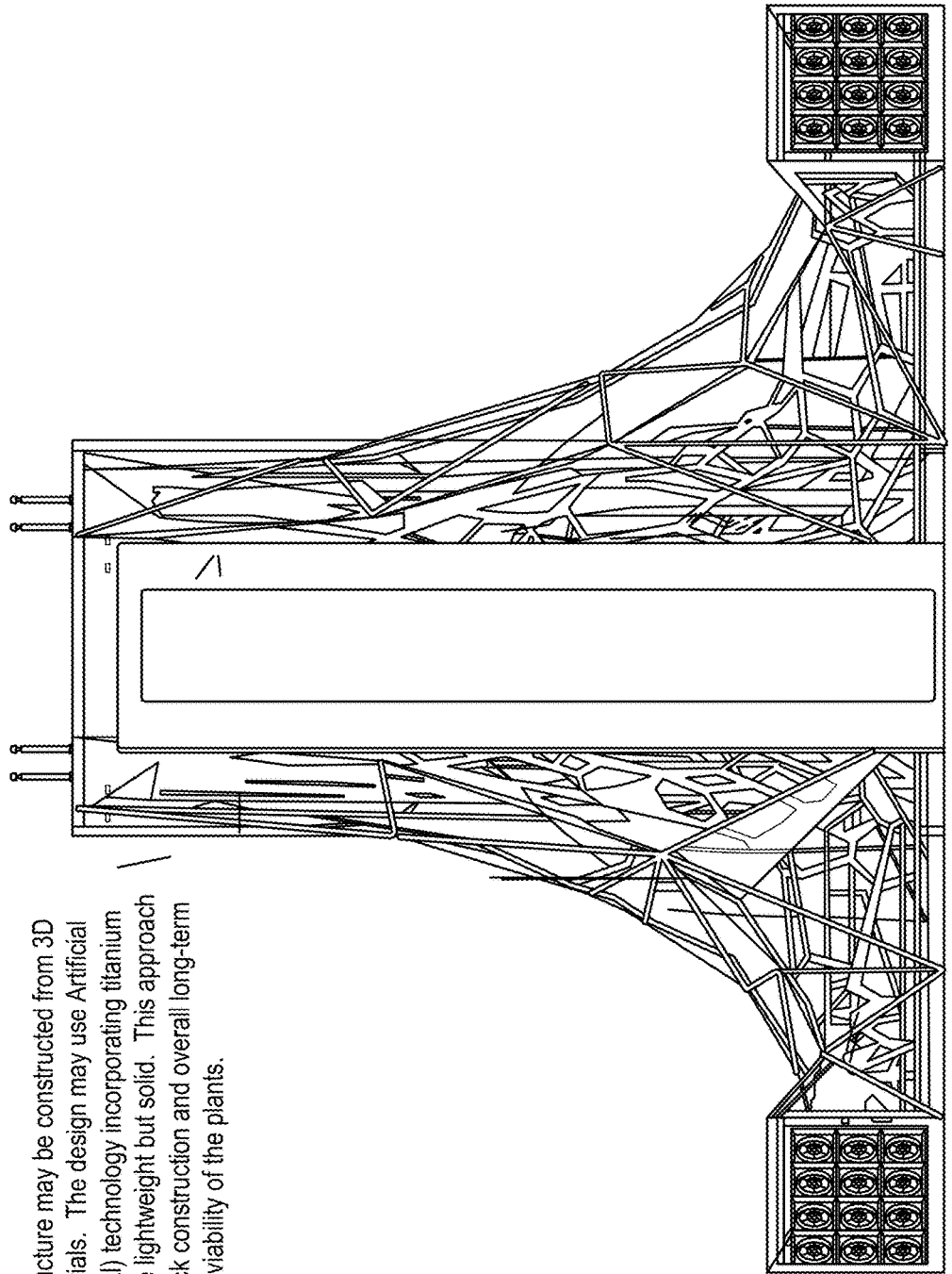
FIG. 6 depicts internal view of EMPS.

FIG. 6 depicts internal view of EMPS.

Figure 7:
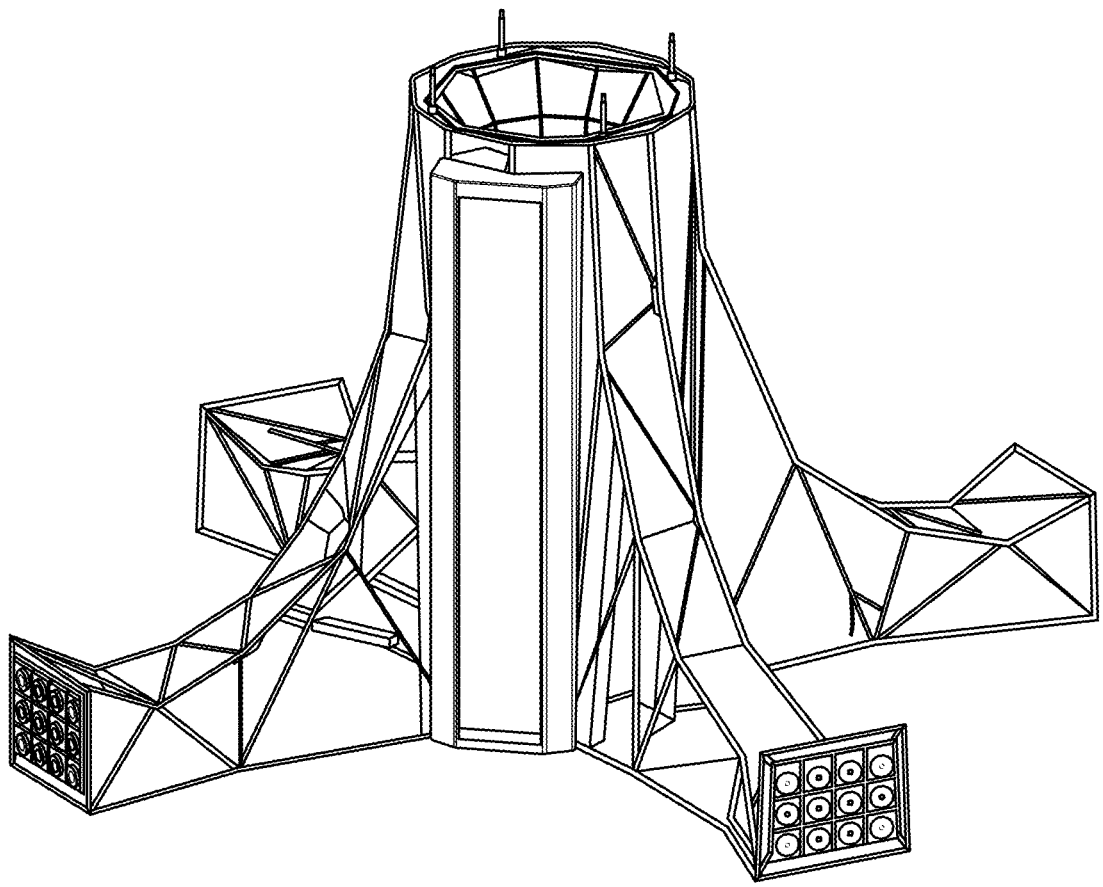
FIG. 7 depicts external view of EMPS.

FIG. 7 depicts external view of EMPS.

Figure 8:
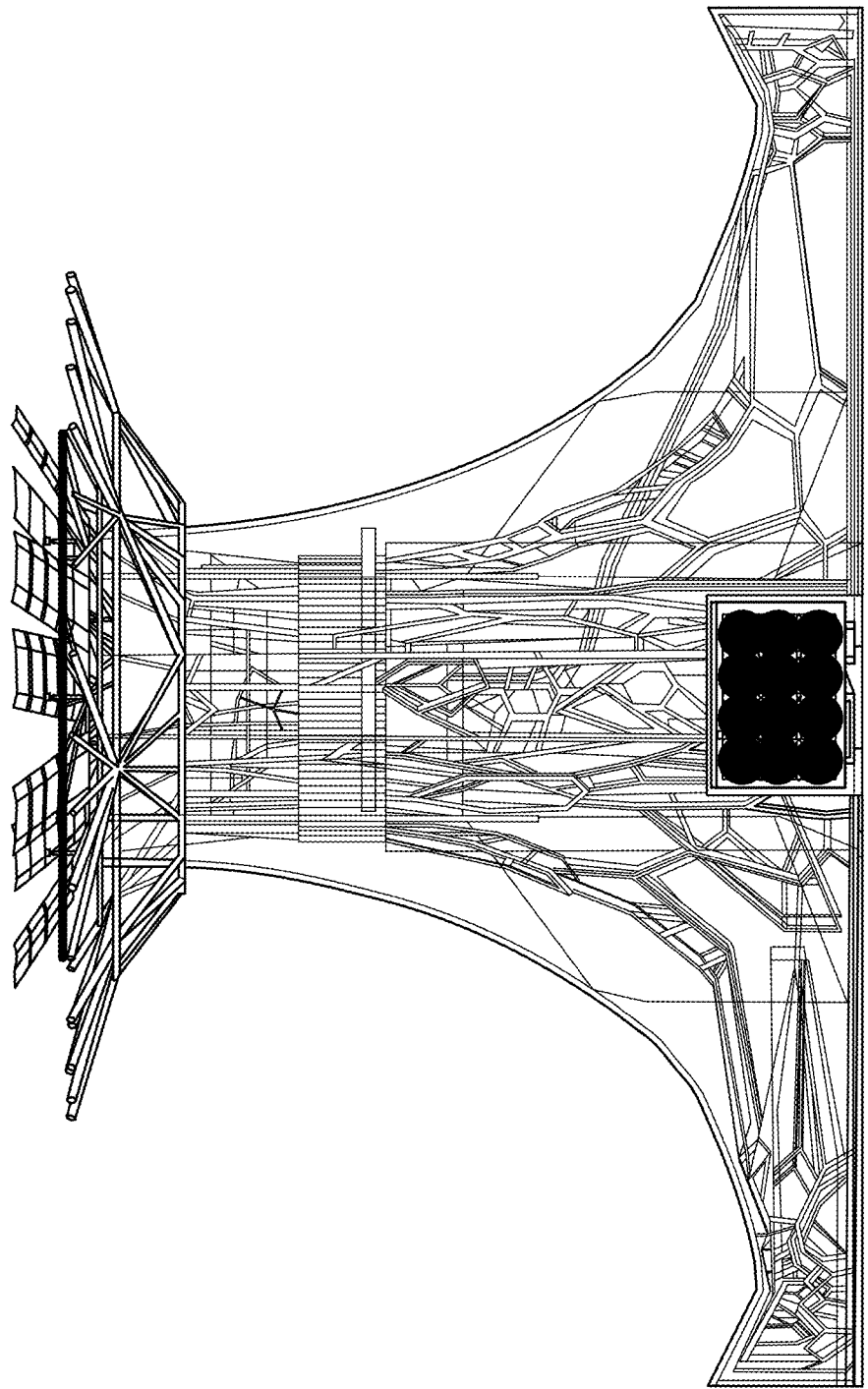
FIG. 8 depicts internal details of EMPS.

FIG. 8 depicts internal details of EMPS.

Figure 9:
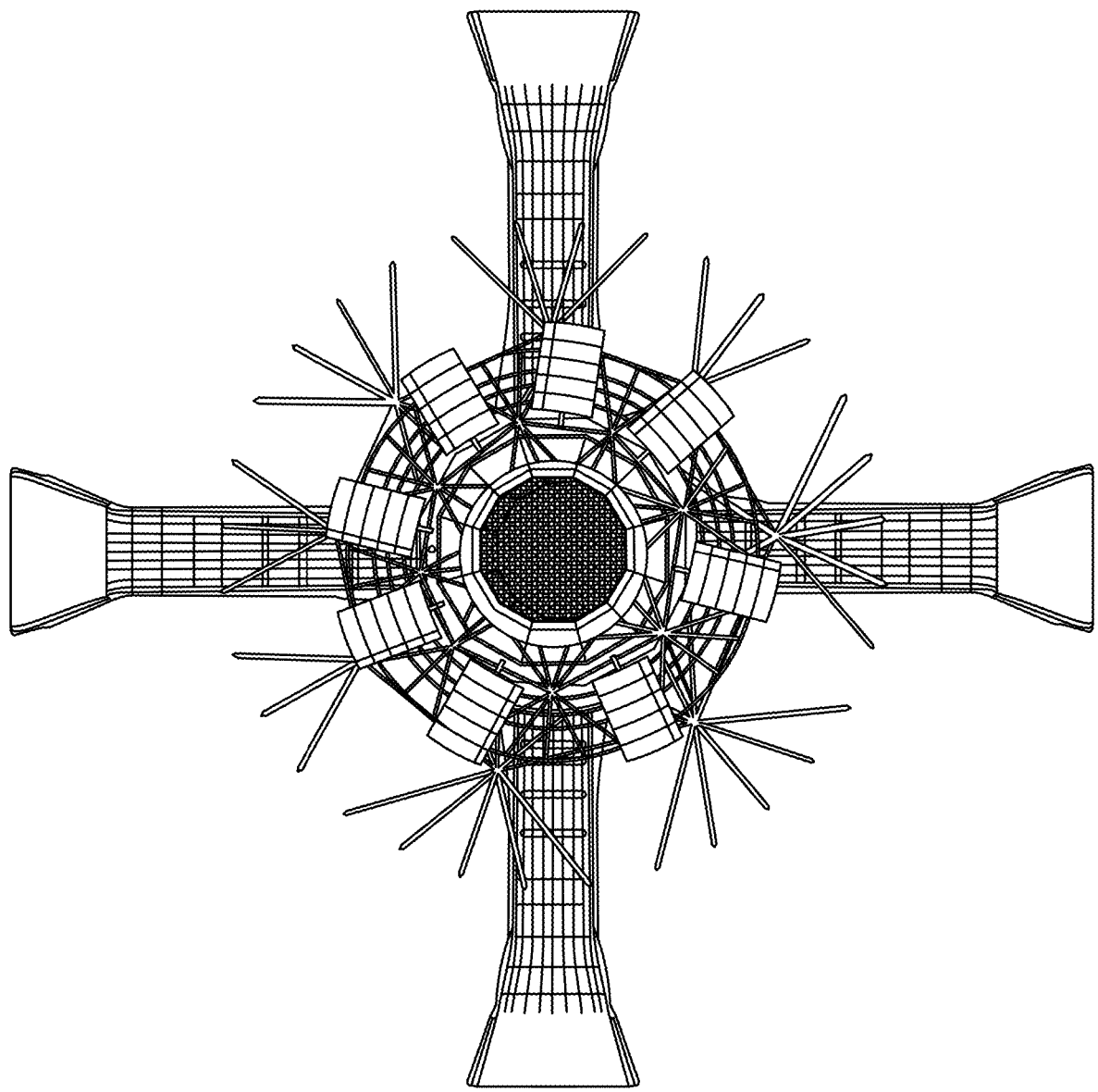
FIG. 9 depicts top view of EMPS.

FIG. 9 depicts top view of EMPS.

Figure 10:
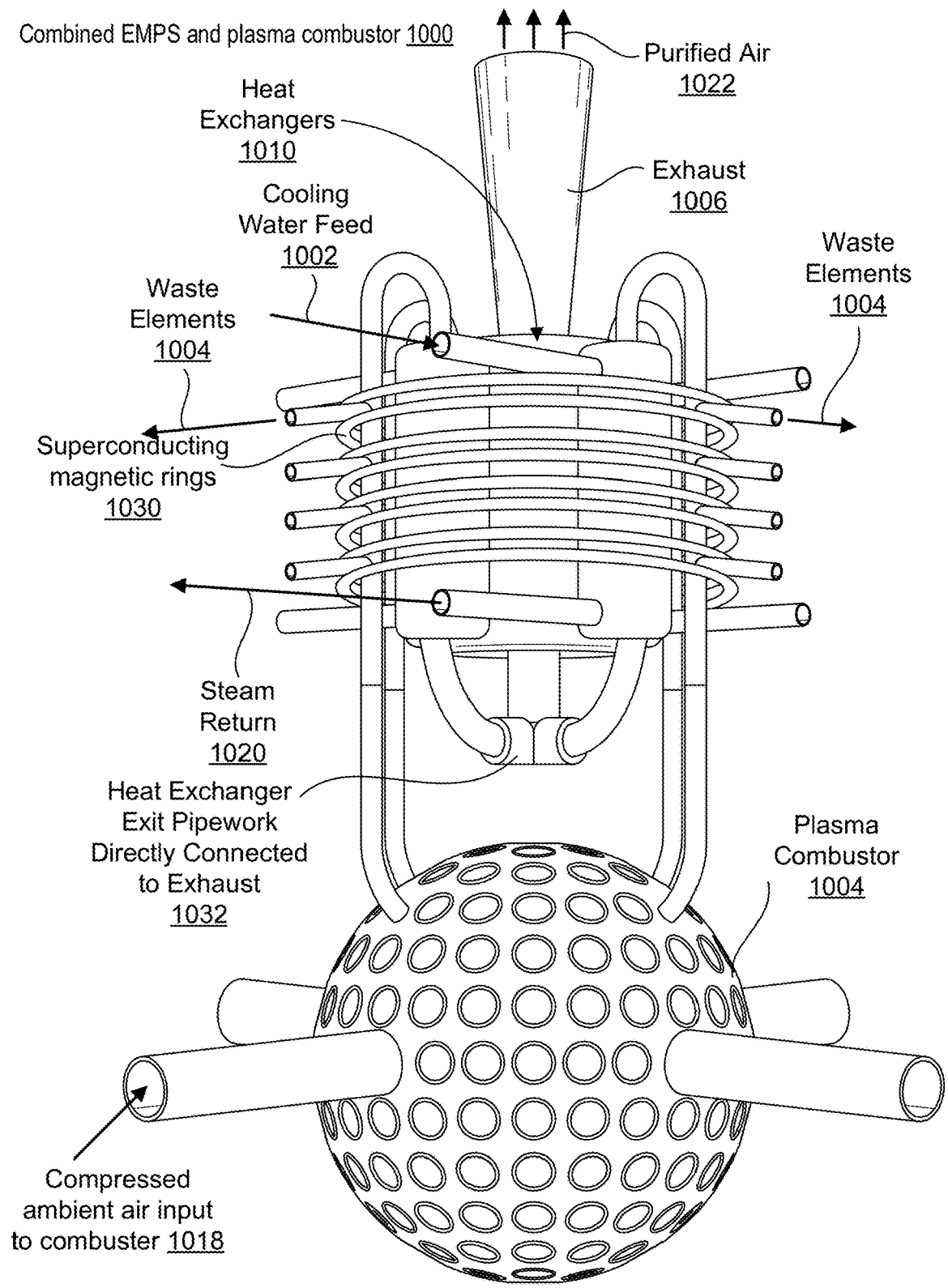
FIG. 10 depicts a schematic view of EMPS and plasma combuster.

FIG. 10 depicts a schematic view of EMPS and plasma combustor. The EMPS takes in compressed ambient air input to combustor 1018. The plasma combustor 1004 heats the ambient air input to become plasma elements. Pipes connect the plasma combustor to the EMPS which has a series of superconducting magnetic rings 1030 and exit pipework directly connected to exhaust 1032. The superconducting magnetic rings 1030 are configured to ensure that the plasma elements are siphoned off at the correct time and not too early or too late. Each ring and pipe are set to siphon a specific element such as $CO_2$, methane, etc. The magnetic range/power of the rings increases as the elements pass from bottom to top. This is to prevent elements with a higher magnetic range from being siphoned off too soon creating a filter system. Each plasma element may be siphoned off as a waste element 1004 or make it to the exhaust 1006 and exit as purified air 1022. The EMPS also has cooling water feed 1002 input, heat exchangers 1010, and a steam return 1020.

Figure 11:
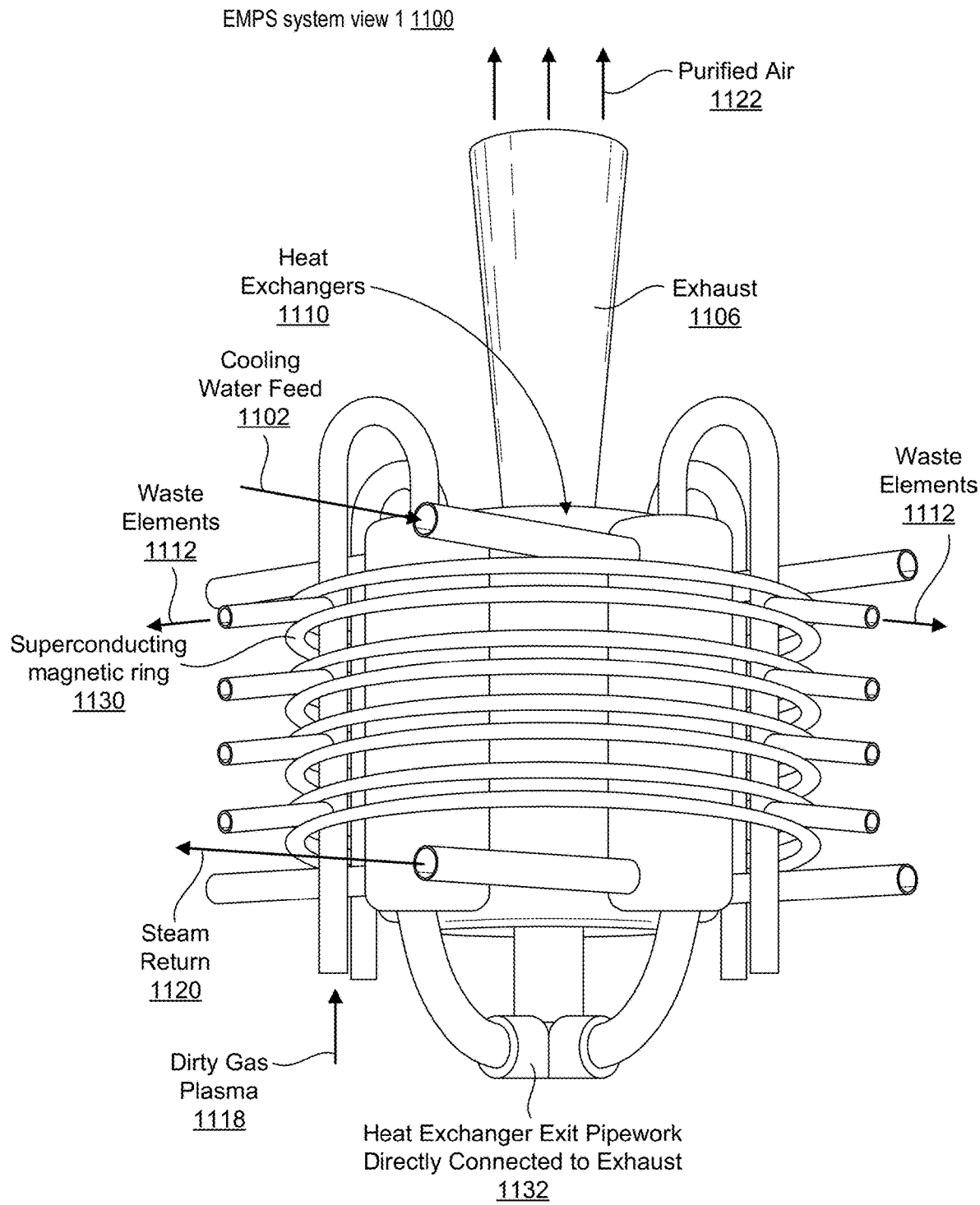
FIG. 11 depicts a schematic view of EMPS.

FIG. 11 depicts a schematic view of EMPS. Dirty gas plasma 1118 enters the EMPS through bottom and is transported back through the pipework directly connected to exhaust 1132. While traveling though the exhaust system, superconducting magnetic rings 1130 are configured to ensure that the plasma elements are siphoned off at the correct time and not too early or too late. Each ring and pipe are set to siphon a specific element such as $CO_2$, methane, etc. The magnetic range/power of the rings increases as the elements pass from bottom to top. Each plasma element may be siphoned off as a waste element 1104 or make it to the exhaust 1106 and exit as purified air 1122. The EMPS also has cooling water feed 1102 input, heat exchangers 1110, and a steam return 1120.

Figure 12:
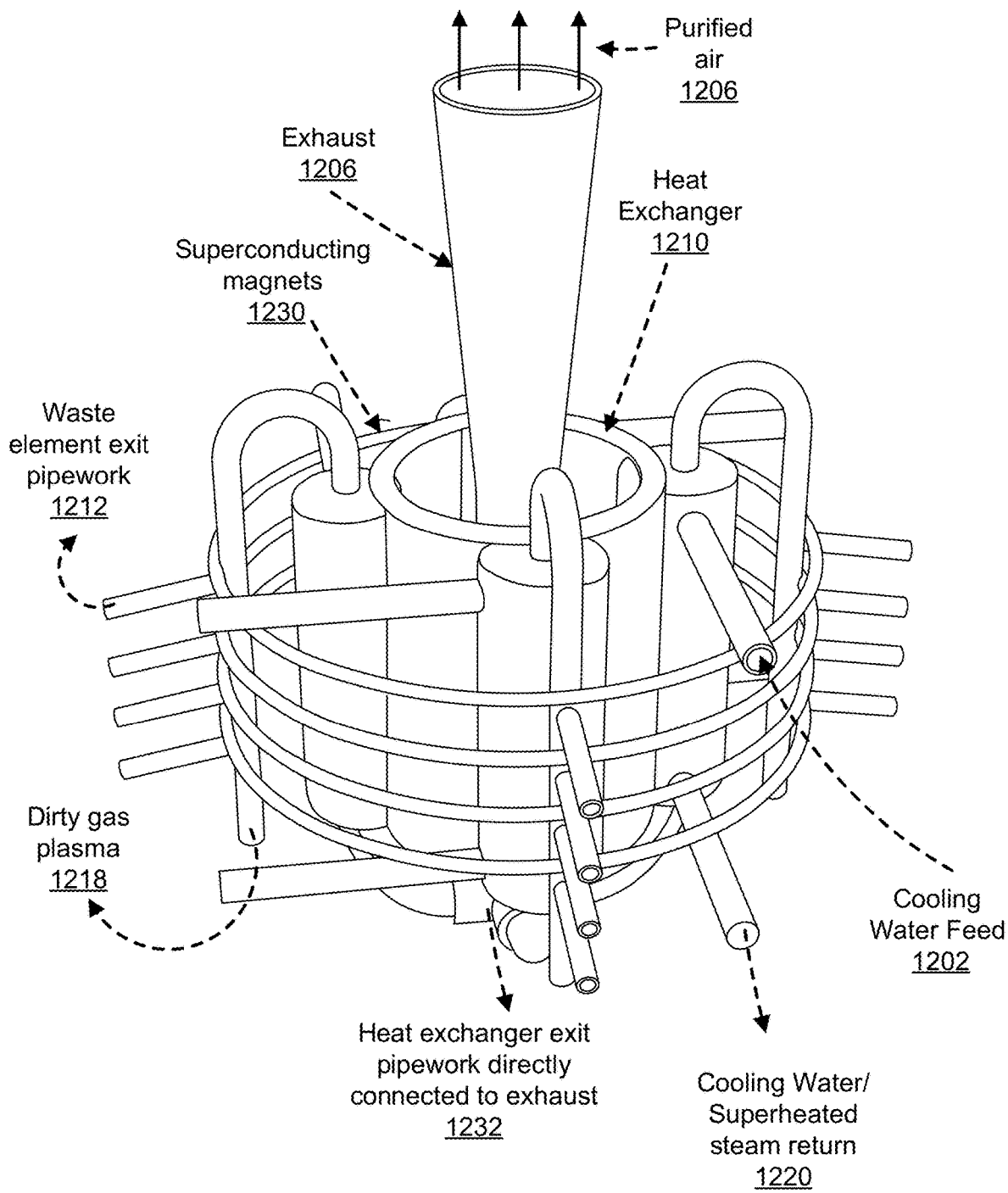
FIG. 12 depicts an exploded view of heat exchanger.

FIG. 12 depicts an exploded view of a heat exchanger portion of the EMPS. Dirty gas plasma 1218 enters the EMPS through bottom and is transported back through the pipework directly connected to exhaust 1232. While traveling though the exhaust system, superconducting magnetic rings 1230 are configured to ensure that the plasma elements are siphoned off at the correct time and not too early or too late. Each ring and pipe are set to siphon a specific element such as $CO_2$, methane, etc. The magnetic range/power of the rings increases as the elements pass from bottom to top. Each plasma element may be siphoned off as a waste element 1204 or make it to the exhaust 1206 and exit as purified air 1222. The EMPS also has cooling water feed 1202 input, heat exchangers 1210, and a steam return 1220.

FIG. 13 depicts an separated view of heat exchanger.

Figure 14:
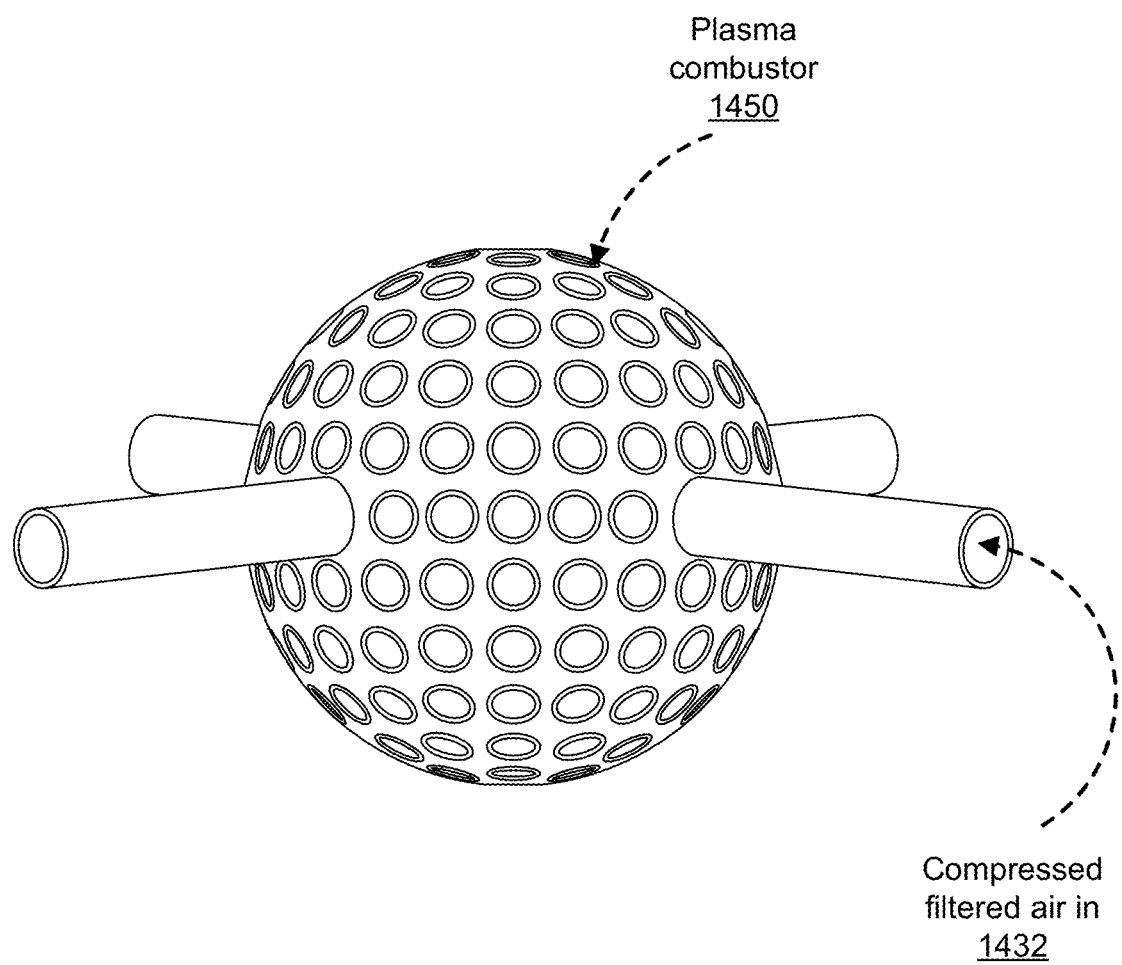
FIG. 14 depicts an exterior view of plasma combustor.

FIG. 14 depicts an exterior view of plasma combustor 1400. The plasma combustor 1450 is shown taking in compressed filtered air input 1432.

Figure 15:
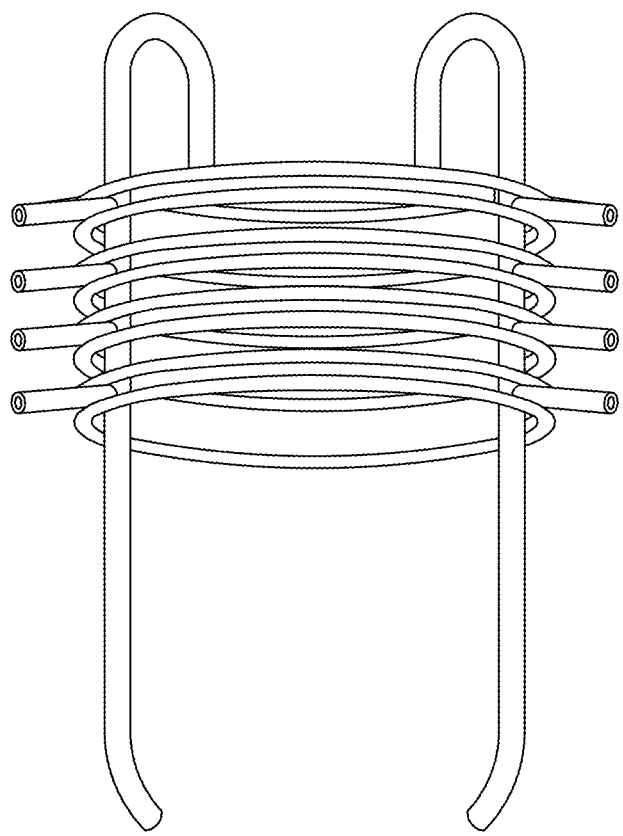
FIG. 15 depicts a view of superconding magnets with plasma pipework.

FIG. 15 depicts a view of superconducting magnets with plasma pipework 1500.

Figure 16:
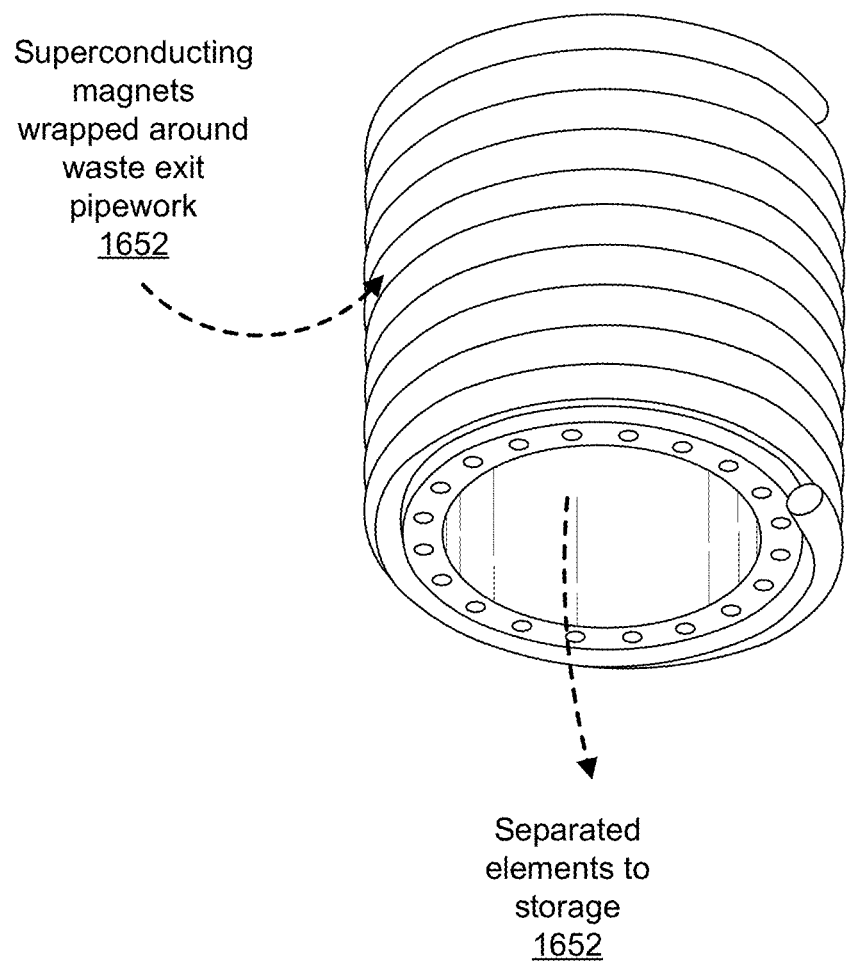
FIG. 16 depicts a view of waste element pipework with superconducting magnets.

FIG. 16 depicts a view of waste element pipework with superconducting magnets 1600. The superconducting magnets are shown wrapped around waste exit pipework 1652 with a view of separated elements to storage 1662.

Figure 17:
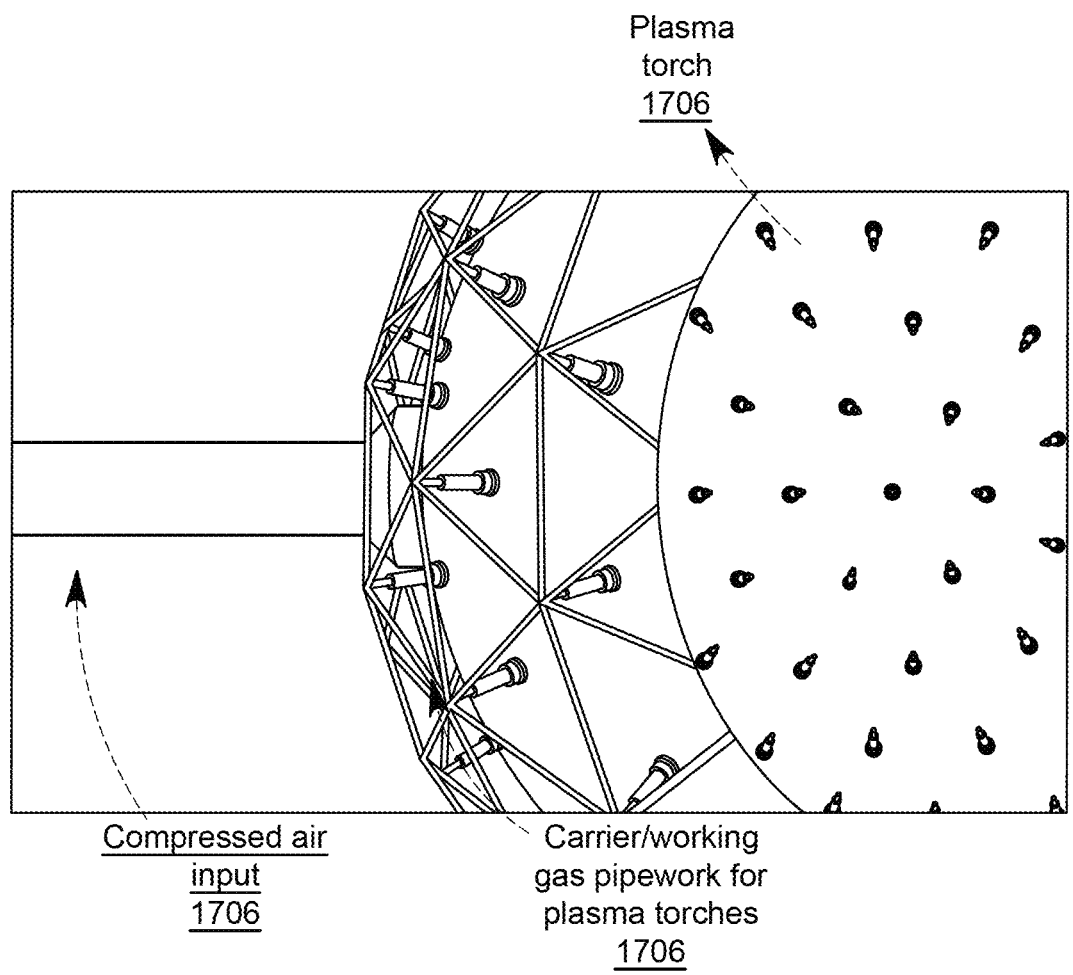
FIG. 17 depicts a view of waste element pipework with superconducting magnets.

FIG. 17 depicts an exploded view of plasma conductor 1700. Compressed air input 1720 is shown as well as a view of plasma torch 1710, and a carrier/working gas pipework for plasm torches 1730.

FIG. 18 depicts an external view of plasma combustor without plasma torch pipework 1800. Compressed air input 1810 and a plasma torch 1820 are shown.

FIG. 19 depicts an external view of plasma combustor with plasma torch pipework 1900. A carrier/working gas pipework for plasma torches 1910 is shown as well as a compressed air input 1920.

FIG. 20 depicts a view of a plasma torch 2000.

Figure 21:
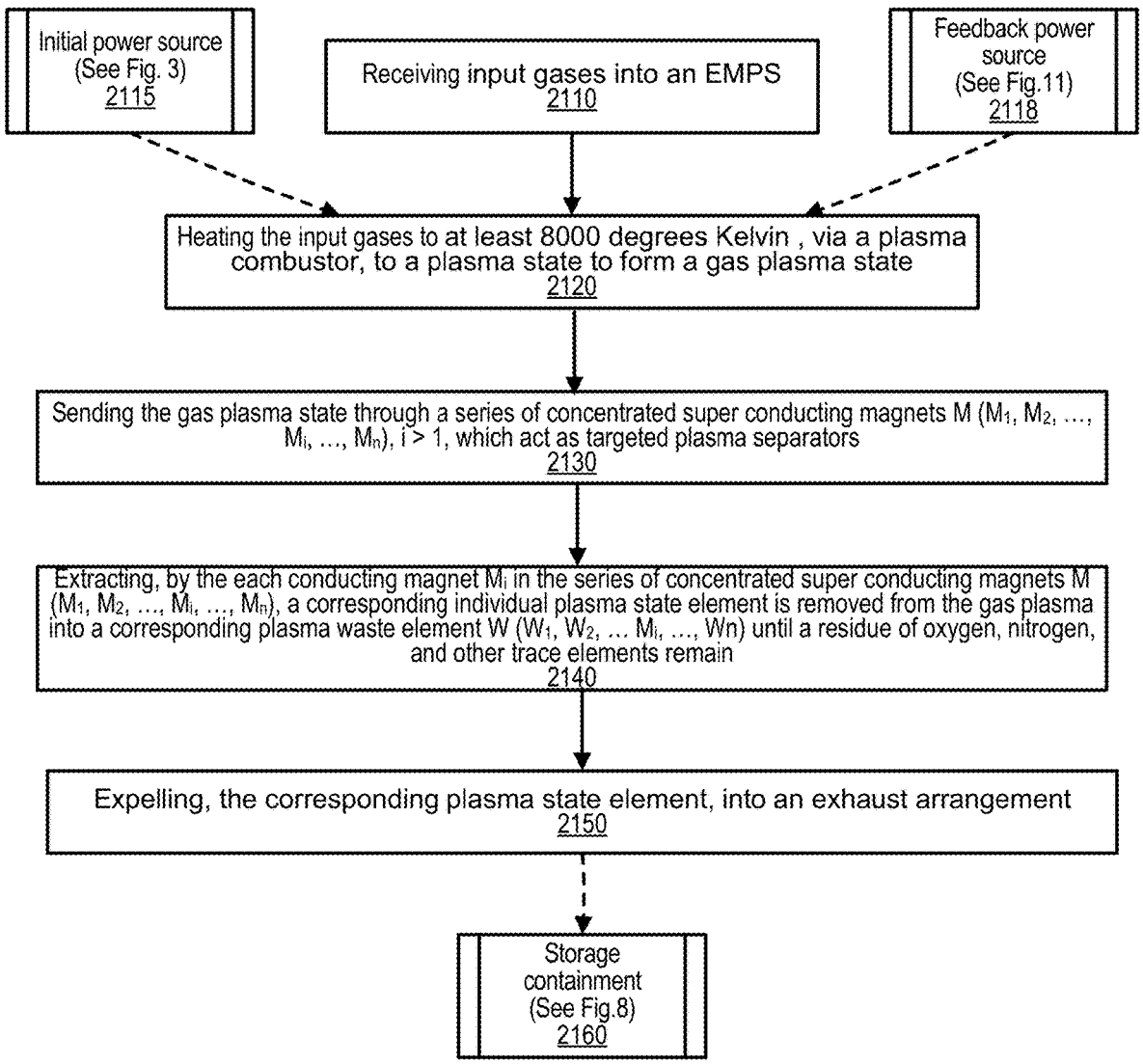
FIG. 21 depicts a flow for extracting Gases from Atmosphere by Electromagnetic Plasma Separator (EMPS)

FIG. 21 depicts a flow for a process that extracts gases from atmosphere by Electromagnetic Plasma Separator (EMPS) 2100. At predefined process 2115, the process performs the Initial power source routine (see FIG. 4 and corresponding text for processing details). At step 2110, the process receives input gases into an EMPS. At step 2120, the process heats the received input gases to at least 8000 degrees Kelvin, via a plasma combustor, to a plasma state to form a gas plasma state. At predefined process 2118, the process performs the feedback power source routine (see FIG. 22 and corresponding text for processing details). At step 2130, the process sends the gas plasma state through a series of concentrated super conducting magnets M (M1, M2, ..., Mi, ..., Mn), i>1, which act as targeted plasma separators. At step 2140, the process extracts, by the each conducting magnet Mi in the series of concentrated super conducting magnets M (M1, M2, ..., Mi, ..., Mn), a corresponding individual plasma state element is removed from the gas plasma into a corresponding plasma waste element W (W1, W2, ... Wi, ..., Wn) until a residue of oxygen, nitrogen, and other trace elements remain. At step 2150, the process expels the corresponding plasma state element, into an exhaust arrangement. At predefined process 2160, the process performs storage containment routine (see FIG. 106 and corresponding text for processing details).

Figure 22:
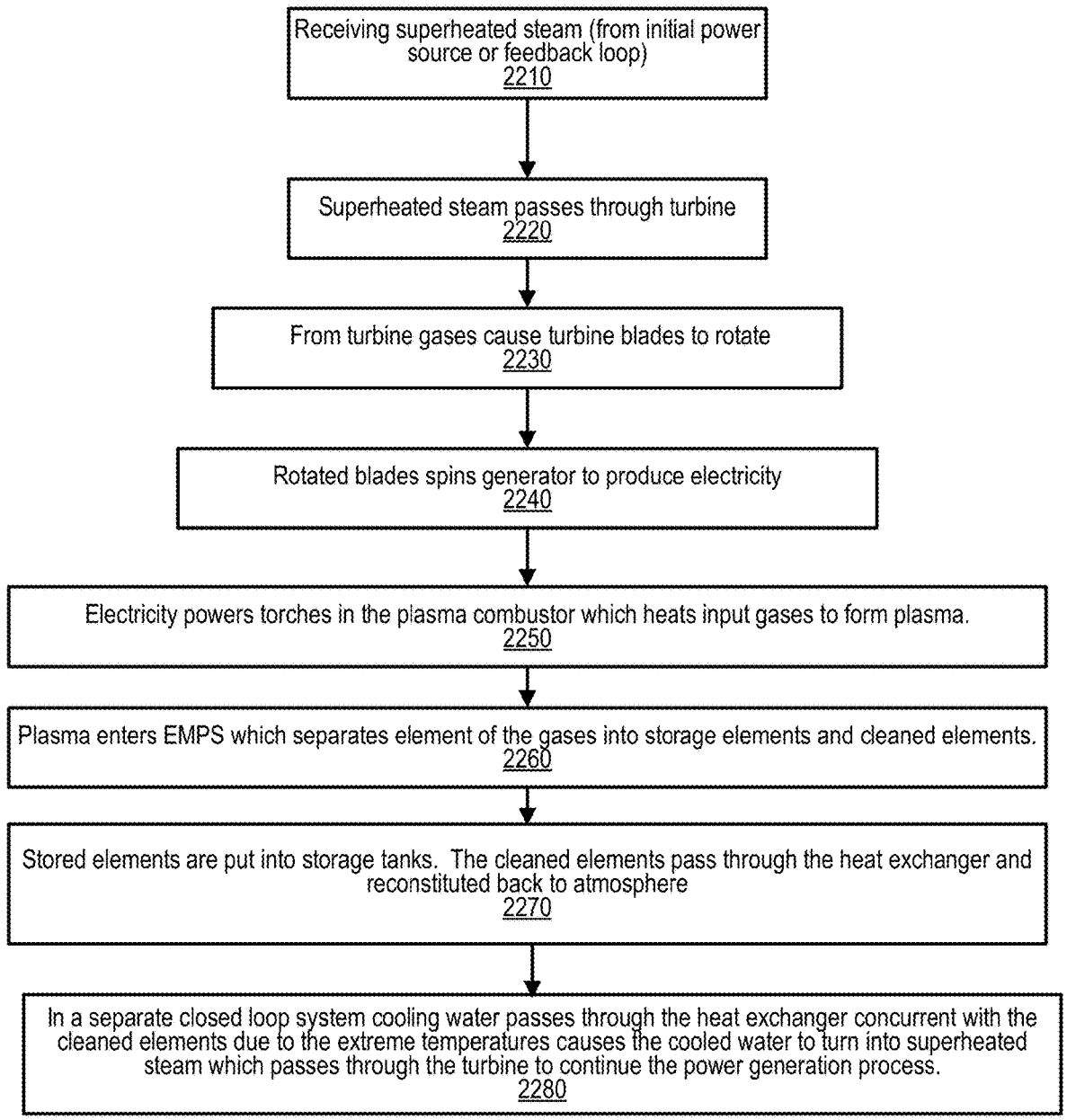
FIG. 22 depicts a flow for feedback from a power source.

FIG. 22 depicts a process flow for feedback from a power source 2200. At step 2210, the process receives superheated steam (from initial power source or feedback loop). At step 2220, the process passes superheated steam through turbine. At step 2230, the gases from the turbine causes the turbine blades to rotate. At step 2240, the rotated blades spin the generator to produce electricity. At step 2250, the electricity powers torches in the plasma combustor which heat input gases to form plasma. At step 2260, the plasma enters the EMPS which separates element of the gases into storage elements and cleaned elements. At step 2270, the stored elements are put into storage tanks. The cleaned elements pass through the heat exchanger and are reconstituted back to atmosphere. At step 2280, in a separate closed loop system, cooling water passes through the heat exchanger concurrent with the cleaned elements. Due to the extreme temperatures, the cooled water turns into superheated steam which passes through the turbine to continue the power generation process.

Figure 23:
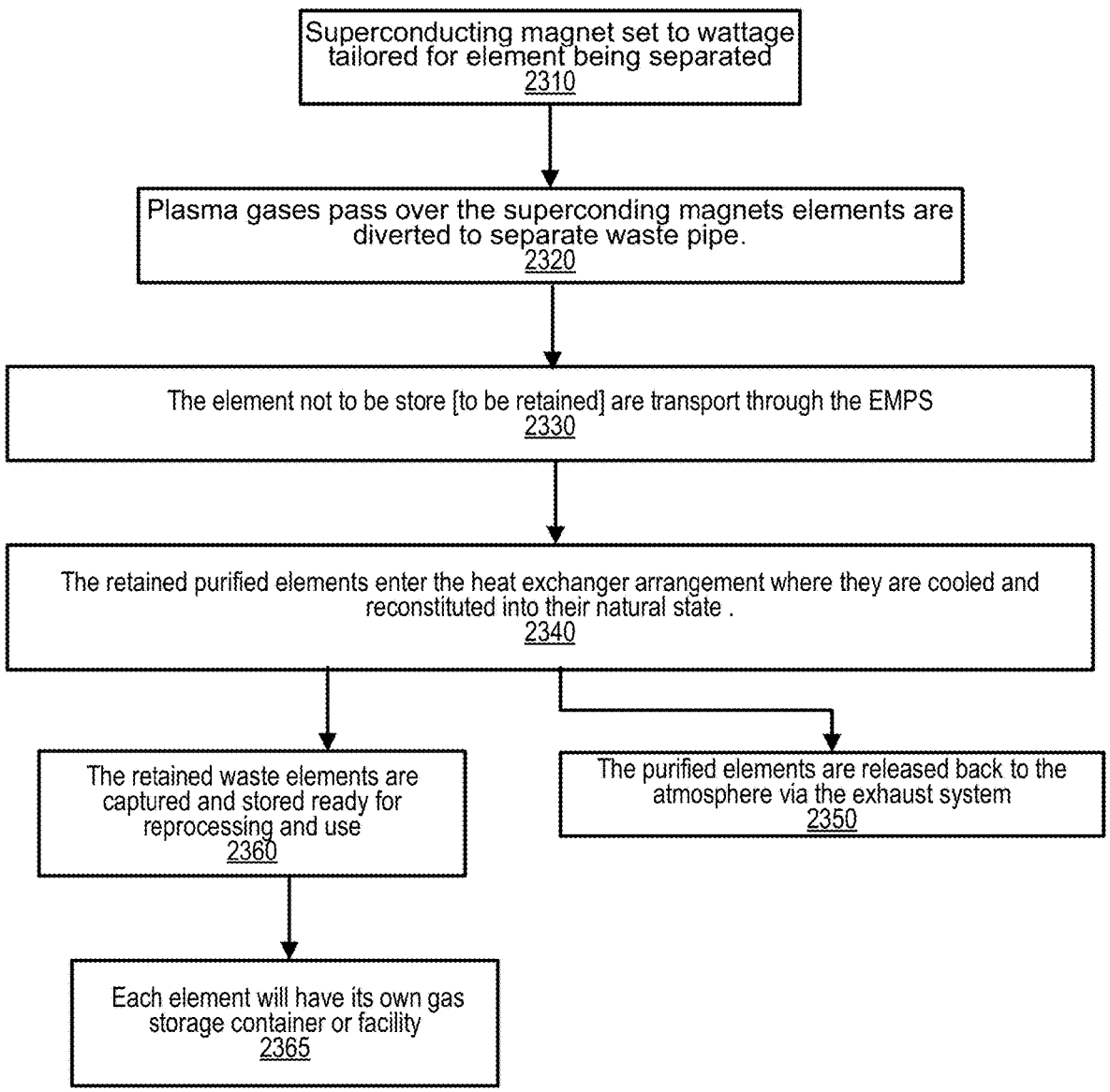
FIG. 23 depicts a flow for selecting and processing elements for release to atmosphere or for storage.

FIG. 23 depicts a flow for selecting and processing elements for release to atmosphere or for storage 2300. At step 2310, the superconducting magnet are set to wattage tailored for element being separated. At step 2320, the plasma gases pass over the superconducting magnets elements and are diverted to separate waste pipe. At step 2330, the element not to be store [to be retained] are transport through the EMPS. At step 2340, the retained purified elements enter the heat exchanger arrangement where they are cooled and reconstituted into their natural state. At step 2350, the purified elements are released back to the atmosphere via the exhaust system. At step 2360, the retained waste elements are captured and stored and are ready for reprocessing and use. Each element will have its own gas storage container or facility 2365.

FIG. 24 depicts input and output air elements 2400. Input air 2410 element percentages and output air 2420 element percentages are shown.

Figure 25:
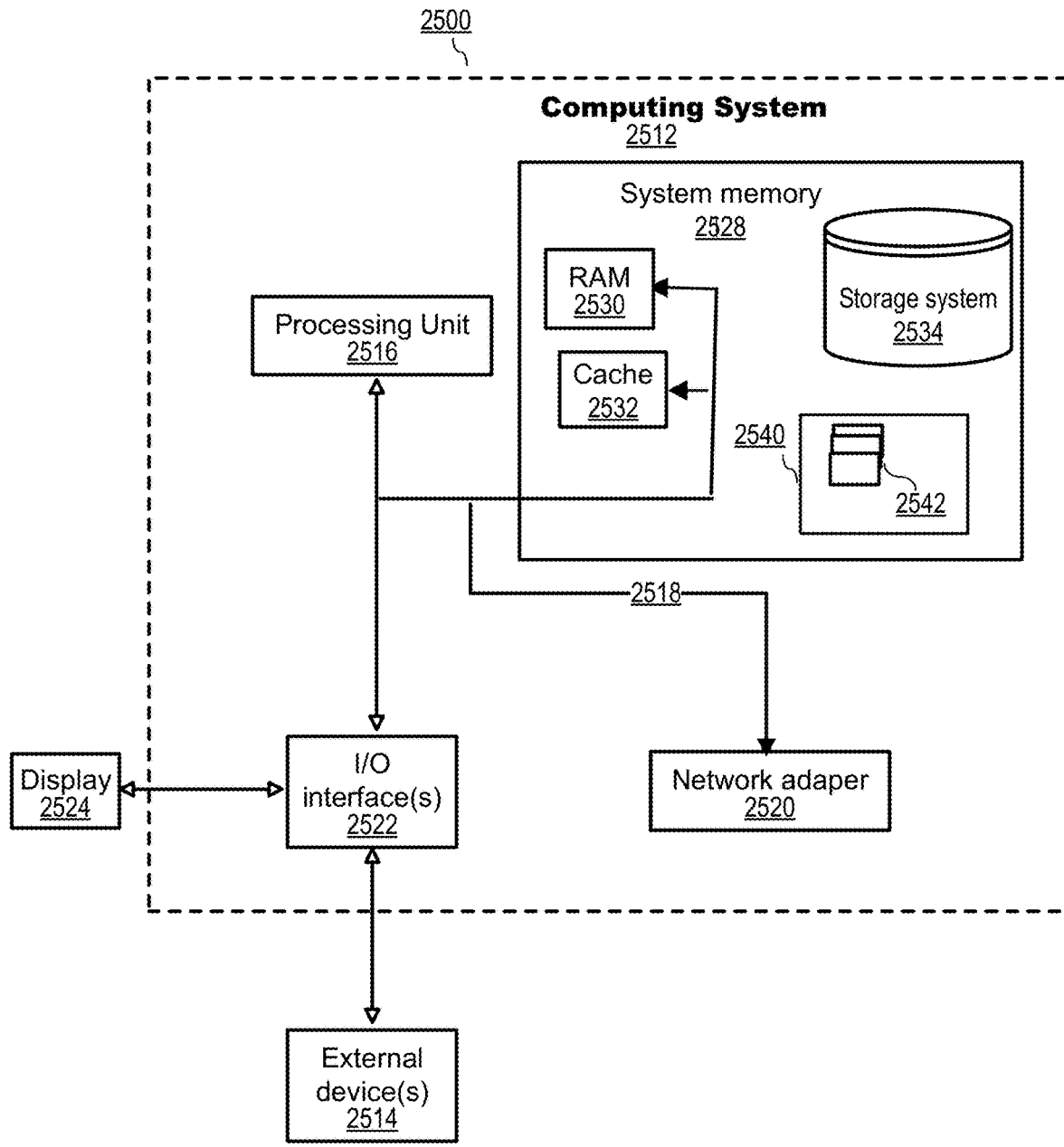
FIG. 25 depicts a processing system in which embodiments of the invention can be implemented.

Referring to FIG. 25, a schematic view of a processing system 2500 is shown wherein the methods of this invention may be implemented. The processing system 2500 is only one example of a suitable system and is not intended to suggest any limitation as to the scope of use or functionality of embodiments of the invention described herein. Regardless, the system 2500 can implement and/or performing any of the functionality set forth herein. In the system 2500 there is a computer system 2512, which is operational with numerous other general purpose or special purpose computing system environments or configurations. Examples of well-known computing systems, environments, and/or configurations that may be suitable for use with the computer system 2512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 2512 may be described in the general context of computer system-executable instructions, such as program modules, being executed by a computer system. Generally, program modules may include routines, programs, objects, components, logic, data structures, and so on that perform tasks or implement abstract data types. The computer system 2512 may be practiced in distributed cloud computing environments where tasks are performed by remote processing devices that are linked through a communications network. In a distributed cloud computing environment, program modules may be in both local and remote computer system storage media including memory storage devices.

As shown in FIG. 25, the computer system 2512 in the system environment 2500 is shown in the form of a general-purpose computing device. The components of the computer system 2512 may include, but are not limited to, a set of one or more processors or processing units 2516, a system memory 2528, and a bus 2518 that couples various system components including the system memory 2528 to the processor 2516.

The bus 2518 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 2512 typically includes a variety of computer system readable media. Such media may be any available media that is accessible by the computer system 2512, and it includes both volatile and non-volatile media, removable and non-removable media.

The system memory 2528 can include computer system readable media in the form of volatile memory, such as random-access memory (RAM) 2530 and/or a cache memory 2532. The computer system 2512 may further include other removable/non-removable, volatile/non-volatile computer system storage media. By way of example only, a storage system 2534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 2518 by one or more data media interfaces. As will be further depicted and described below, the system memory 2528 may include at least one program product having a set (e.g., at least one) of program modules 2542 that are configured to carry out the functions of embodiments of the invention.

A program/utility 2540, having the set (at least one) of program modules 2542, may be stored in the system memory 2528 by way of example, and not limitation, as well as an operating system, one or more application programs, other program modules, and program data. Each of the operating systems may have one or more application programs, other program modules, and program data or some combination thereof, and may include an implementation of a networking environment. The program modules 2542 generally carry out the functions and/or methodologies of embodiments of the invention as described herein.

The computer system 2512 may also communicate with a set of one or more external devices 2514 such as a keyboard, a pointing device, a display 2524, a tablet, a digital pen, etc. wherein these one or more devices enable a user to interact with the computer system 2512; and/or any devices (e.g., network card, modem, etc.) that enable the computer system 2512 to communicate with one or more other computing devices. Such communication can occur via Input/Output (I/O) interfaces 2522. These include wireless devices and other devices that may be connected to the computer system 2512, such as, a USB port, which may be used by a tablet device (not shown). Still yet, the computer system 2512 can communicate with one or more networks such as a local area network (LAN), a general wide area network (WAN), and/or a public network (e.g., the Internet) via a network adapter 2520. As depicted, a network adapter 2520 communicates with the other components of the computer system 2512 via the bus 2518. It should be understood that although not shown, other hardware and/or software components could be used in conjunction with the computer system 2512. Examples include, but are not limited to microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for extracting elements from input gases comprising:
    receiving the input gases into an electromagnetic plasma separator;
    heating air to at least 8000 degrees Kelvin, via a plasma combustor, to a form a gas plasma elements state;
    sending the gas plasma elements state through a series of concentrated super conducting magnets M ($M_1$, $M_2$, . . . , $M_i$, . . . , $M_n$), i>1, which act as targeted plasma separators;
    extracting, by the each conducting magnet $M_i$ in the series of concentrated super conducting magnets M ($M_1$, $M_2$, . . . , $M_i$, . . . , $M_n$), a corresponding individual plasma state element $S_i$ from the gas plasma elements state; and
    expelling, the corresponding individual plasma state element $S_i$, into a separation arrangement.

2. The method of claim 1, further comprising:
    separating, by the separation arrangement, the gas plasma elements state into a set of released elements and a set of captured elements;
    releasing the set of released elements; and
    capturing the set of captured elements.

3. The method of claim 1, wherein an initial power source is used to bootstrap the heating of the air to the at least 8000 degrees Kelvin and a closed loop steam cycle heat transfer utilizing a heat exchanger unit feeds a liquid around primary heat exchangers cooling the gas plasma and heating the liquid creating superheated steam which is pumped toward a steam turbine; and
    generating power by the steam turbine to form a secondary power source for the heating of the air.

4. The method of claim 3, wherein the liquid is water.

5. The method of claim 1, wherein plasma waste elements W ($W_1$, $W_2$, ... $W_i$, ... , Wn) expel the individual plasma state elements into separated industrial gas storage tanks for processing.

6. The method of claim 5, wherein the processing is to turn the plasma waste elements W into synthetic fuels.

7. The method of claim 5, wherein the processing is to reuse the plasma waste elements W.

8. A system for extracting elements from input gases comprising:
one or more processors;
a memory coupled to at least one of the processors; and
a set of computer program instructions stored in the memory and executed by at least one of the one or more processors in order to perform actions comprising:
receiving the input gases into an electromagnetic plasma separator;
heating air to at least 8000 degrees Kelvin, via a plasma combustor, to a form a gas plasma elements state;
sending the gas plasma elements state through a series of concentrated super conducting magnets M ($M_1$, $M_2$, ... , $M_i$, ... , $M_n$), i>1, which act as targeted plasma separators;
extracting, by the each super conducting magnet $M_i$ in the series of concentrated super conducting magnets M ($M_1$, $M_2$, ... , $M_i$, ... , $M_n$), a corresponding individual plasma state element $S_i$ from the gas plasma elements state; and
expelling, the corresponding individual plasma state element $S_i$, into a separation arrangement.

9. The system of claim 8, wherein the actions further comprises:
separating, by the separation arrangement, the gas plasma elements state into a set of released elements and a set of captured elements;
releasing the set of released elements; and
capturing the set of captured elements.

10. The system of claim 8, wherein an initial power source is used to bootstrap the heating of the air to the at least 8000 degrees Kelvin and a closed loop steam cycle heat transfer utilizing a heat exchanger unit feeds a liquid around primary heat exchangers cooling the gas plasma and heating the liquid creating superheated steam which is pumped toward a steam turbine; and
generating power by the steam turbine to form a secondary power source for the heating of the air.

11. The system of claim 10, wherein the liquid is water.

12. The system of claim 8, wherein plasma waste elements W ($W_1$, $W_2$, ... $W_i$, ... , Wn) expel the individual plasma state elements into separated industrial gas storage tanks for processing.

13. The system of claim 12, wherein the processing is to turn the plasma waste elements W into synthetic fuels.

14. The system of claim 12, wherein the processing is reuse the plasma waste elements W.

15. The method of claim 1, further comprising:
extracting iteratively for each super conducting magnet $M_i$, i starting at 1 and incrementing by 1 until reaching n, the corresponding individual plasma state element $S_i$ from the gas plasma elements state, eliminating the corresponding individual plasma state element $S_i$ from the gas plasma elements state.

16. The method of claim 15, further comprising:
extracting elements from the gas plasma elements state selected from a group consisting of $CO_2$, Ne, He, $CH_4$, Kr, $H_2$, $N_2O$, $O_3$, and $SO_2$.

17. The method of claim 15, further comprising:
configuring each super conducting magnet $M_i$, i starting at 1 and incrementing by 1 until reaching n to prevent extracting from the plasma elements state a selected set of elements not extracted.

18. The method of claim 17, wherein the selected elements not extracted are selected from a group consisting of $N_2$, $O_2$, and Ar.

19. The method of claim 17, further comprising:
releasing to the air the selected set of elements not extracted by each super conducting magnet $M_i$, i starting at 1 and incrementing by 1 until reaching n from the plasma elements state.

* * * * *